(12) United States Patent
Farrell et al.

(10) Patent No.: US 10,607,324 B2
(45) Date of Patent: Mar. 31, 2020

(54) IMAGE HIGHLIGHT DETECTION AND RENDERING

(71) Applicant: DOLBY LABORATORIES LICENSING CORPORATION, San Francisco, CA (US)

(72) Inventors: Suzanne Farrell, Mountain View, CA (US); Scott Daly, Kalama, WA (US); Timo Kunkel, Kensington, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 191 days.

(21) Appl. No.: 15/564,188

(22) PCT Filed: Apr. 26, 2016

(86) PCT No.: PCT/US2016/029370
§ 371 (c)(1),
(2) Date: Oct. 3, 2017

(87) PCT Pub. No.: WO2016/176209
PCT Pub. Date: Nov. 3, 2016

(65) Prior Publication Data
US 2018/0130188 A1    May 10, 2018

Related U.S. Application Data

(60) Provisional application No. 62/153,886, filed on Apr. 28, 2015.

(51) Int. Cl.
*G06T 5/00* (2006.01)
*G06T 7/90* (2017.01)

(52) U.S. Cl.
CPC .......... *G06T 5/007* (2013.01); *G06T 7/90* (2017.01); *G06T 2207/20208* (2013.01)

(58) Field of Classification Search
CPC .. G06T 5/007; G06T 7/90; G06T 2207/20208
See application file for complete search history.

(56) References Cited

U.S. PATENT DOCUMENTS

| | | | |
|---|---|---|---|
| 6,061,091 | A  | 5/2000 | Van De Poel |
| 6,707,453 | B1 | 3/2004 | Rossin |
| 7,088,388 | B2 | 8/2006 | MacLean |
| 7,398,927 | B2 | 7/2008 | Olmstead |

(Continued)

FOREIGN PATENT DOCUMENTS

WO    2012/007892    1/2012

OTHER PUBLICATIONS

Angelopoulou, Elli "Specular Highlight Detection Based on the Fresnel Reflection Coefficient" IEEE 11th International Conference on Computer Vision, Oct. 14-21, 2007, pp. 1-8.

(Continued)

*Primary Examiner* — Siamak Harandi

(57) ABSTRACT

A highlight mask is generated for an image to identify one or more highlights in the image. One or more highlight classifiers are determined for the one or more highlights in the image. One or more highlight gains are applied with the highlight mask to luminance amplitudes of pixels in the one or more highlights in the image to generate a scaled image. The one or more high-light gains for the one or more highlights are determined based at least in part on the one or more highlight classifiers determined for the one or more highlights.

21 Claims, 11 Drawing Sheets

(56) References Cited

U.S. PATENT DOCUMENTS

| | | | |
|---|---|---|---|
| 7,457,477 | B2 | 11/2008 | Petschnigg |
| 7,630,002 | B2 | 12/2009 | Jenkins |
| 7,873,219 | B2 | 1/2011 | Friedhoff |
| 8,050,512 | B2 | 11/2011 | Daly |
| 8,212,857 | B2 | 7/2012 | Keam |
| 8,285,039 | B2 | 10/2012 | Komiya |
| 8,351,090 | B2 | 1/2013 | Makino |
| 8,483,479 | B2 | 7/2013 | Kunkel |
| 8,577,135 | B2 | 11/2013 | Garg |
| 8,693,773 | B2 | 4/2014 | Tsukada |
| 9,607,364 | B2 | 3/2017 | Xu |
| 2010/0026731 | A1 | 2/2010 | Konuma |
| 2010/0232705 | A1 | 9/2010 | Li |
| 2011/0305388 | A1 | 12/2011 | Wedi |
| 2012/0219218 | A1 | 8/2012 | Demandolx |
| 2013/0321679 | A1 | 12/2013 | Lim |

OTHER PUBLICATIONS

Bajcsy, R. et al "Detection of Diffuse and Specular Interface Reflections and Inter-Reflections by Color Image Segmentation" International Journal of Computer Vision 17(3), 241-272 (1996), Kluwer Academic Publishers.

Torres, F. et al "Automatic Detection of Specular Reflectance in Colour Images Using the MS Diagram" International Conference on Computer Analysis of Images and Patterns, pp. 132-139, 2003.

Lin, S. et al "Diffuse-Specular Separation and Depth Recovery from Image Sequences" ECCV Proceedings of the 7th European Conference on Computer Vision—Part III, pp. 210-224, May 28-31, 2002.

Tian, Q. et al "Real-Time Specularity Detection Using Unnormalized Wiener Entropy" IEEE International Conference in Computer and Robot Vision, 2013, pp. 356-363.

Rouf, M. et al "Gradient Domain Color Restoration of Clipped Highlights" IEEE Computer Society Conference on Computer Vision and Pattern Recognition Workshops, Jun. 16-21, 2012, pp. 7-14.

Meylan, L. et al "Tone Mapping for High Dynamic Range Displays" Proc. SPIE 6492, Human Vision and Electronic Imaging XII, 649210, Feb. 12, 2007, pp. 1-12.

Klinker, G. et al "Using a Color Reflection Model to Separate Highlights from Object Color" Proc. First International Conference on Computer Vision (ICCV), pp. 145-150, (London, UK), 1987.

Klinker, G. J. et al "The Measurement of Highlights in Color Images" International Journal of Computer Vision 2, 7-32 (Jun. 1988), Kluwer Academic Publishers Manufacture in The Netherlands, pp. 7-32.

Tan, R.T. et al "Color Constancy Through Inverse-Intensity Chromaticity Space" vol. 21, No. 3, Mar. 2004, J. Opt. Soc.Am, pp. 321-334.

Park, J.B. et al "A Truncated Least Squares Approach to the Detection of Specular Highlights in Color Images" Proc. of the 2003 IEEE International Conference on Robotics & Automation, Taipei, Taiwan, Sep. 14-19, 2003, pp. 1397-1403.

SMPTE ST 2084:2014 "High Dynamic Range EOTF of Mastering Reference Displays".

Kunkel, Timo "Identifying Perceived Lightsources" Chapter 7 in Colour Appearance Modelling for Digital Imaging Pipelines (2010).

IMAGE HIGHLIGHT DETECTION AND RENDERING

CROSS-REFERENCE TO RELATED APPLICATIONS

The present application is related to U.S. Pat. No. 8,483,479, titled "Light Detection, Color Appearance Models, and Modifying Dynamic Range for Image Display," filed on May 4, 2010, and issued on Jul. 9, 2013, which claims the benefit of U.S. Provisional Patent Application No. 61/177,262, filed on May 11, 2009. The present application is also related to International Patent Application No. PCT/US2014/066394, titled "Methods and Systems for Inverse Tone Mapping," filed on Nov. 19, 2014, which claims the benefit of U.S. Provisional Application No. 61/907,996, filed on Nov. 22, 2013. The present application claims the benefit of U.S. Provisional Patent Application No. 62/153,886, filed on Apr. 28, 2015. The above-mentioned patent applications are assigned to the assignee of the present application and are incorporated by reference herein.

TECHNOLOGY

The present invention relates generally to displaying images. More particularly, an embodiment of the present invention relates to image highlight detection and rendering.

BACKGROUND

Different displays may differ significantly in supported colors (or gamut), achievable dynamic ranges, white points, spatial resolutions, etc. A standard dynamic range (SDR) display has a narrow dynamic range, and thus a very limited ability to render images that have lightness variations exceeding the narrow dynamic range supported by the SDR display. A high dynamic range (HDR) display has a dynamic range much higher than that of an SDR display, and thus a much larger ability to render images that have relatively large lightness variations.

While an image is normally intended to be rendered exactly according to the creative intent, in cases where capabilities of a display are constrained, a display management (DM) algorithm could be used to algorithmically map the image to device-dependent values within the display's capabilities. Under display management, highlights in images could be mapped up to different maximum brightness levels that are respectively supported by different displays. However, highlights as rendered under existing approaches could cause the same image to look disparately different to viewers from display to display.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Figure 1A:
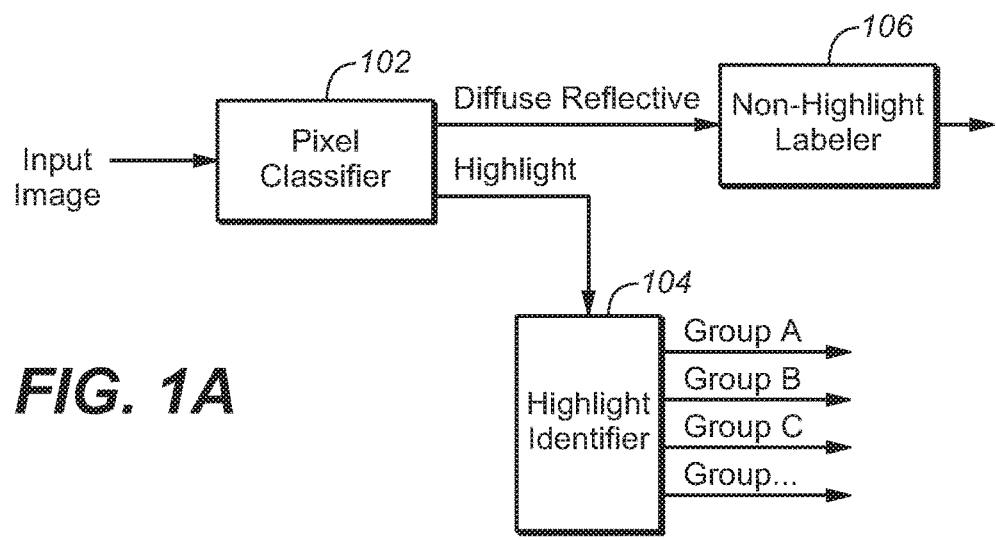
FIG. 1A depicts example classifying and grouping an input image into non-highlight regions and highlight groups.

Example embodiments, which relate to image highlight detection and rendering, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. CLASSIFICATION OF PIXELS
3. CLASSIFICATION OF HIGHLIGHTS
4. HIGHLIGHT GAINS AND SCALING OF LUMINANCE AMPLITUDES
5. HIGHLIGHT PROCESSING
6. EXAMPLE PROCESS FLOWS
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of an embodiment of the present invention. It should be noted that this overview is not an extensive or exhaustive summary of aspects of the embodiment. Moreover, it should be noted that this overview is not intended to be understood as identifying any particularly significant aspects or elements of the embodiment, nor as delineating any scope of the embodiment in particular, nor the invention in general. This overview merely presents some concepts that relate to the example embodiment in a condensed and simplified format, and should be understood as merely a conceptual prelude to a more detailed description of example embodiments that follows below.

Techniques as described herein can be used to detect highlights of various sizes in an image. In some embodiments, these highlights in the image can be automatically detected using one or more of a wide variety of available highlight detection algorithms Examples of available highlight detection algorithms include, but are not limited to only, any of: histogram-based highlight detection algorithms, difference-of-Gaussians highlight detection algorithms, Fresnel reflection coefficient based algorithms, color image segmentation based algorithms, etc. Some discussion of example highlight detection algorithms may be found in Mushfiqur Rouf et al., "Gradient Domain Color Restoration of Clipped Highlights," 978-1-4673-1612-5/12 IEEE (2012); Laurence Meylan et al., "Tone Mapping for High Dynamic Range Displays," Proc. SPIE 6492, Human Vision and Electronic Imaging XII, 649210 (Feb. 12, 2007); G. J. Klinker et al., "Using a Color Reflection Model to Separate Highlights from Object Colors," Proc. First International Conference on Computer Vision (ICCV), pp. 145-150, (London, UK), 1987; G. J. Klinker et al., "The Measurements of Highlights in Color Images," International Journal of Computer Visions Volume 2, pp. 7-32 (June 1988); R. T. Tan et al., "Color Constancy Through Inverse Intensity Space," Journal of the Optical Society of America A Volume 21 (March 2004); J. B. Park et al., "A Truncated Least Squares Approach to the Detection of Specular Highlights in Color Images," Proc. International Conference on Robotics and Automation, pp. 1397-1403, (Taipei, Taiwan) September 2003; the content of the above-mentioned references are incorporated by reference herein. Additionally, optionally, or alternatively, in some embodiments, highlight detection in an image can be based at least in part on manually-assisted region selection that helps identify one or more specific regions in the image for detecting/determining a maximum diffuse white (DW) point, one or more specific regions in the image for detecting highlights, etc.

Based on one or more of the available highlight detection algorithms, pixels in an input image may be classified into non-highlight pixels and highlight pixels. The highlight pixels, which represent portions (or regions) of the image that have luminance levels higher than a DW point as determined for the image, may be separated or grouped into zero or more highlight groups (or regions) each of which shares a respective distinct set of highlight attributes. Example highlights in an image or a highlight group thereof are specular reflections, emissives (or surfaces that appear emissives), etc. An emissive as described herein represents a self-emanating light source, whereas a specular reflection as described herein represents a non-self-emanating light source. The non-highlight pixels, which may represent one or more non-highlight regions in the image with luminance levels no higher than a diffuse white (DW) point, are labeled differently from the highlight pixels, and may include diffuse reflections, dark areas, mid-tone areas, etc., in the image. In some embodiments, a highlight mask that indicates highlights in an image may be specified or generated by applying one or more of the highlight detection algorithms individually or in combination.

In some embodiments, each highlight group in the image is analyzed and classified according to highlight type, highlight size, highlight surround level, etc. A highlight size (e.g., a large highlight size, a small highlight size, etc.) can be determined for a highlight group by comparing a total number of pixels, a total spatial area occupied by pixels, etc., in the highlight group with a (e.g., fixed, pre-configured, image-dependent, scene-dependent, region-dependent, dynamic, adaptive, etc.) highlight size threshold. In a first non-limiting example, a threshold area size such as an L20 patch, which is defined as 20% of each of horizontal and vertical dimensions of a display panel and thus amounts to 4% of the image area of the display panel, may be used to determine whether a highlight size is large or small. In a second non-limiting example, a threshold area size, which is determined based on viewer preference studies, may be used to determine whether a highlight size is large or small. A highlight type for a highlight group may include, but is not necessarily limited to only, mixed, specular only, specular, emissive, white object, etc. A highlight surround level refers to a luminance level, a brightness level, etc., of non-highlight regions surrounding a highlight group. The highlight surround level may be computed based on luma or luminance values of non-highlight pixels in the image, non-highlight pixels in regions local to a highlight group, etc. Additionally, optionally, or alternatively, other attributes/types associated with one or more highlight groups in the image can also be determined/identified/classified.

Under techniques as described herein, a highlight management table may be set up to determine highlight gains for highlights and highlight groups, etc., in highlight management operations. The highlight management table may be constructed with viewer preference studies that are designed to capture qualitative and/or quantitative user preferences in highlight management/rendering among a user population of viewers, photographers, colorists, video engineers, etc. In some embodiments, input parameters to the highlight management table (e.g., the rows and columns categories, etc.) comprise highlight classifiers (which may include attributes or classifiers related to highlight surrounds) selected from candidate highlight classifiers involved in the user preference studies. Different combinations of highlight classifiers may lead to different gain factors that are to be applied to highlights in highlight groups. These gain factors can be used to select different highlight gains (e.g., in numeric values, in ratios, as multiplicative factors, as exponents, etc.) to scale luminance amplitudes of highlights of images. Highlight gains for a specific highlight or a specific highlight group in an image may be set to different values for different display applications, for different available dynamic ranges, for different display parameters associated with different display devices, etc.

After luminance values, including but not limited to luminance amplitudes, in highlights of the image are scaled (e.g., as controlled by a highlight mask, etc.) with one or more highlight gains each of which is selected based on a gain factor as described herein, pixels in the highlights with scaled luminance amplitude in the image can be recombined with pixels in non-highlight regions of the image that are not scaled with the highlight gains. In some embodiments, luminance values, luminance amplitudes, etc., as described herein may be represented by code words defined in a non-linear PQ domain. In some embodiments, these code values may not be linearly scaled with luminance values, gamma compressed/expanded luminance values, etc. The term "PQ" as used herein refers to perceptual quantization of luminance values, luminance amplitude, etc. The human visual system responds to light levels as indicated by luminance values, luminance amplitudes, etc., in a very non-linear way. A human's perceptual ability to a visual stimulus is affected by the luminance of that stimulus, the size of the stimulus, the spatial frequencies making up the stimulus, and the luminance level that the eyes have adapted to at the particular moment one is viewing the stimulus. A perceptual quantizer mapping function may be used to convert linear input gray levels (e.g., linearly scaled with luminance values, etc.) to perceptually quantized code words that better match the contrast sensitivity thresholds in the human visual system. Examples of PQ mapping functions (or EOTFs) are described in SMPTE ST 2084:2014 "High Dynamic Range EOTF of Mastering Reference Displays," which is incorporated herein by reference in its entirety. Compared with other approaches that use non-perceptually quantized luminance values, gamma compressed/expanded values, a PQ mapping function/curve imitates relatively faithfully visual responses of the human visual system to light levels. Additionally, optionally, or alternatively, highlight management techniques as described herein can operate in conjunction with non-highlight-specific processing operations such as display mapping, tone mapping, inverse tone mapping, etc., that may process and/change luminance values of both highlight and non-highlight pixels in an image.

In some embodiments, some or all of the highlights in the image may be represented as an addition (e.g., an additional image, a differential image, a residue image, etc.), a partial highlight image, etc., to an underlying non-highlight image comprising non-highlight regions of the image. The addition to the underlying non-highlight image may comprise relative luminance values of pixels in the highlights of the image that are differences between absolution luminance values of the pixels in the highlights of the image and a reference luminance value (e.g., a luminance value that caps non-highlight regions of the image, a DW point, etc.). The addition, the partial highlight image, etc, can be combined with the rest of the image based on the highlight mask. In some embodiments, at least one of the partial highlight image and the underlying non-highlight image is perceptually encoded with PQ code words. In some embodiments, at least one of the partial highlight image and the underlying non-highlight image is not perceptually encoded with PQ code words, but rather with non-PQ code words such as linear gray levels, gamma compressed/expanded values, etc. A highlight mask as described herein may or may not be a mask with binary values only. In some embodiments, the highlight mask may comprise graduations or differential levels for the purpose of merging scaled highlights with highlight surrounds in a realistic manner, for the purpose of preserving patterns or textures in highlights such as traffic lights covered with textured glass lenses, etc. Additionally, optionally, or alternatively, a smoothened highlight mask such as a highlight mask smoothened with an alpha function, a sigmoid function, etc., may be used to describe or process non-highlight portions depicting super-whites (e.g. UV-active whiteners in paper, etc.) that are visually brighter than a DW point but not bright enough to be handled as 100% highlight pixels.

Highlight detection and rendering as described herein can be used in conjunction with, or as a part of, one or more advanced display management algorithms used to render images with specific display devices. In some embodiments, a display device such as a light steering projector, a projector with auxiliary highlight channels, an emissive display, a direct light emitting diode (LED) display, an organic LED (OLED) display, etc., may comprise a highlighting mechanism to direct additional light for rendering highlights in regions of an image. Highlight management operations as described herein may output non-highlight image data and highlight image data as separate data to an image rendering device/module, without actually combining or recombining pixels in the highlights of the image with pixels in the non-highlight regions of the image and sending the recombined image to an image rendering device/module for rendering the recombined image. For example, in embodiments in which an image rendering device such as a projector that has a highlight projection setup separate from an overall image projection setup, the addition, the highlight image, the highlight mask, etc., as discussed above may be provided to the image rendering device for driving the separate highlight projection setup to render the highlights of the image, while the non-highlight image, etc., as discussed above may be provided separately to the image rendering device for driving the overall image projection setup to render the underlying non-highlight image, or the non-highlight regions of the image.

In some embodiments, a tool implementing at least some of the techniques as described herein can be used as a part of a post-production color grading system to (e.g., programmatically, automatically, etc.) generate initial suggestions to colorists, producers, directors, etc., on how an image with highlights should be color graded in cases in which highlight tradeoffs are needed.

In an example implementation, highlight management operations may be broken down into a plurality of stages such as an image pre-processing stage, a highlight detection stage, a highlight management stage, etc. An image may comprise image data in one or more channels (or components) of a color space such as an RGB color space, an XYZ color space, an YCbCr color space, an YDzDx color space, a perceptually quantized color space, etc. In some embodiments, color channel values defining a DW point for the image is first determined. Subsequently, a white balanced image is generated by performing illumination source color estimation operations, white balance compensation operations, etc., on the image, for example, to remove unrealistic color cast that may be introduced in image acquisition.

The white balanced image may be normalized into a normalized image in which the relative luminance value represented by the channel values defining the DW point is a fixed value such as one (1), etc. The normalized image can be renormalized into a renormalized image in which an absolute luminance value for the DW point in the image is set to a specific absolute luminance value which may be dependent on any of: display applications, display devices, display technologies, dynamic ranges of display devices, image content in scenes or groups of pictures, image content represented in images, etc.

In some embodiments, the renormalized image may be used to detect highlights in the image that was used to derive the renormalized image. A highlight mask for highlight management may be generated to identify highlights that comprise pixels with luminance values no less than the luminance value represented by the channel values defining the DW point. These highlights may be classified or identified into one or more highlight groups each of which shares a distinctive set of values for highlight classifiers such as a highlight type, a highlight surround level, a highlight size, etc.

The highlight mask, the highlight classifiers, etc., may be used to compute/select highlight gains to generate a scaled renormalized image by scaling luminance amplitude of the highlight groups in the renormalized image. The scaled renormalized image is then converted to an output image into a target color gamut supported by a target display application, a target display device, etc. The target color gamut may be in a target color space which may or may not the same as the color space in which the (input) image is represented.

In some embodiments, highlight management/rendering techniques as described herein maintain and/or calculate local maximum luminance peaks of highlights in one or more images based on image characteristics, scene characteristics, display device characteristics, display application characteristics, etc.

In some embodiments, at least some of these techniques can be used in tandem with a display device such as a high dynamic range (HDR) projector, a direct view display, etc., for detecting highlights in image frames, determining power and light allotment on a frame-to-frame basis, etc. Highlights may be separated from the images and rendered/generated above a specific luminance level (e.g., that of a DW point, etc.) up to a ceiling highlight luminance level by a special highlight projection mechanism separate from an overall non-highlight projection mechanism that renders the images up to the specific luminance level.

In some embodiments, mechanisms as described herein form a part of a media processing system, including, but not limited to: a professional display device, a consumer display device, a consumer multimedia system, a handheld device, game machine, television, laptop computer, tablet computer, netbook computer, cellular radiotelephone, projectors, cinema system, electronic book reader, point of sale terminal, desktop computer, computer workstation, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Classification of Pixels

Highlight pixels (or non-diffuse reflective pixels) in an image refer to portions (or regions) of the image that have luminance levels higher than a diffuse white (DW) point as determined for the image. Non-highlight pixels in an image represent portions (or regions) of the image that have luminance levels no higher than a diffuse white (DW) point as determined for the image. A highlight in an image may refer to one or more contiguous (or non-dispersed) pixels that are classified as highlight pixels in the image. A non-highlight region in an image may refer to a set of contiguous (or non-dispersed) pixels that are classified as non-highlight pixels in the image. A highlight group may refer to a group of highlights that shares a respective distinct set of highlight attributes.

Examples of highlights may include, but are not limited to only, any of: specular reflections, emissives, etc. An emissive refers to a portion (of an image) that represents a self-emanating light source. A specular reflection refers to a highlight that does not represent a self-emanating light source. Highlight pixels even with the same intensity may belong to very different highlights such as stars, sunset, neon signs, water speckling, aluminum foil reflections, specular reflections off chrome parts of a car, etc. Examples of non-highlight regions may include, but are not limited to only, any of: diffuse reflections, dark areas, mid-tone areas, etc., in the image.

It should be noted that terminologies as used herein may have different meanings as compared with terminologies used in photography. By way of comparison, white lace, such as bridal gowns, etc., may give rise to white textures that are sometimes referred to as highlights in photography. However, as used herein, such objects give rise to mostly diffuse reflections, which are classified as non-highlight (pixels), except possibly relatively small specular reflections off of those objects such as generated by some types of bright shiny lace material, etc.

Under techniques as described herein, highlight management/rendering by a display device may vary from highlight to highlight in an image, depending on respective highlight types, highlight sizes, non-highlight regions surrounding highlights, etc., of different highlights in the image, in order to render the image with perceptual qualities consistent with aesthetical and/or artistic intent of the (original) image, in a realistic manner based on scene characteristics, viewer preferences, etc.

FIG. 1A depicts example classifying and grouping an input image (frame) into one or more non-highlight regions (e.g., diffuse reflections, etc.) and zero, one or more highlight groups (or regions). In some embodiments, an image processor (not shown) comprises a pixel classifier 102 that is implemented with one or more computing devices. The pixel classifier (102) can be configured to receive/access image data (e.g., pixel values, RGB values, IPT values, YCbCr values, etc.) representing the input image, classify each pixel of some or all pixels in the input image as either highlight or non-highlight, based on an analysis of the image data, etc.

For the purpose of illustration, the input image comprises pixels that are classified as highlight by the pixel classifier (102). These highlight pixels can be sent by the pixel classifier (102) to a highlight identifier 104 for further processing. The highlight identifier (104) may be a part of the same image processor that includes the pixel classifier (102), or may be a part of a separate downstream image processor.

In some embodiments, the highlight identifier (104) comprises software, hardware, a combination of software and hardware, etc., configured to identify/classify the highlight pixels into one or more different highlight groups (e.g., Group A, Group B, Group C, etc.) each of which is classified based on a distinct set of highlight attributes that are different from those on which other highlight groups are classified. The highlight identifier (104) may be configured to generate a respective highlight descriptor for each (group) of the different highlight groups based on a respective set of highlight attributes, locations of highlight pixels, etc. A highlight descriptor for a highlight group may identify a set of pixels (among the pixels that are classified as highlight pixels in the input image) as belonging to the highlight group. In some embodiments, the highlight identifier (104) outputs a highlight descriptor and pixel values for a set of highlight pixels in each and every highlight group of some or all of highlight groups in the image to downstream modules for further image analyses, classifications, manipulations, etc.

Pixels that are classified as non-highlight in the image by the pixel classifier (102), or non-highlight pixels, can be sent by the pixel classifier (102) to a non-highlight labeler 106 for further processing. The non-highlight labeler (106) may be a part of the same image processor that includes the pixel classifier (102), or a part of a separate downstream image processor.

In some embodiments, the non-highlight labeler (106) comprises software, hardware, a combination of software and hardware, etc., configured to generate non-highlight pixel labels for the pixels to indicate that the pixels are non-highlight (e.g., diffuse reflections, etc.) in the input image. Additionally, optionally, or alternatively, the non-highlight pixel labels comprise locations of non-highlight pixels in the image. In some embodiments, the non-highlight labeler (106) outputs the non-highlight pixel labels and pixel values for the non-highlight pixels in the input image to downstream modules for further image analyses, classifications, manipulations, etc.

In some embodiments, the highlight identifier (104) is configured to group or separate the highlight pixels into the highlight groups based on types of highlights. For example, the highlight identifier (104) may use color to identify a specific set of pixels as highlight pixels belonging to a specific highlight group representing a specific type of highlight. For example, an image of a car with brake lights being turned on in the daytime may have specular highlights on the metal of the car caused by the sun. Being mostly white in color, and brighter than any of diffuse reflection portions (or regions) of the image, these specular highlights may be grouped into a specific highlight group representing specular highlights on the metal of the car. Being emissive and having a red color, the brake lights of the car in the image may be grouped into a second specific highlight group representing emissives.

In some embodiments, the highlights within a specific highlight group are not necessarily contiguous, and may be dispersed, such as multiple specular reflections off different parts of the car in the image. Sunlight reflections off of speckles of water are another type of highlight that may be dispersed (non-contiguous), yet grouped together in a specific highlight group if present in the image. In various embodiments, an image may have just one highlight group, or two or more highlight groups.

Highlights and/or highlight pixels may be identified based on one or more highlight detection algorithms For example, in some embodiments, a DW point may be determined or identified programmatically, automatically, manually, etc., for an image. Highlights in the image can be determined by locating pixels with luminance values or luma values greater than the DW point in the image. A highlight mask that indicates highlights in the (original) image may be specified or generated based on pixels with luminance values above the DW point, pixels with luminance values no more than the DW point, etc.

Figure 1B:
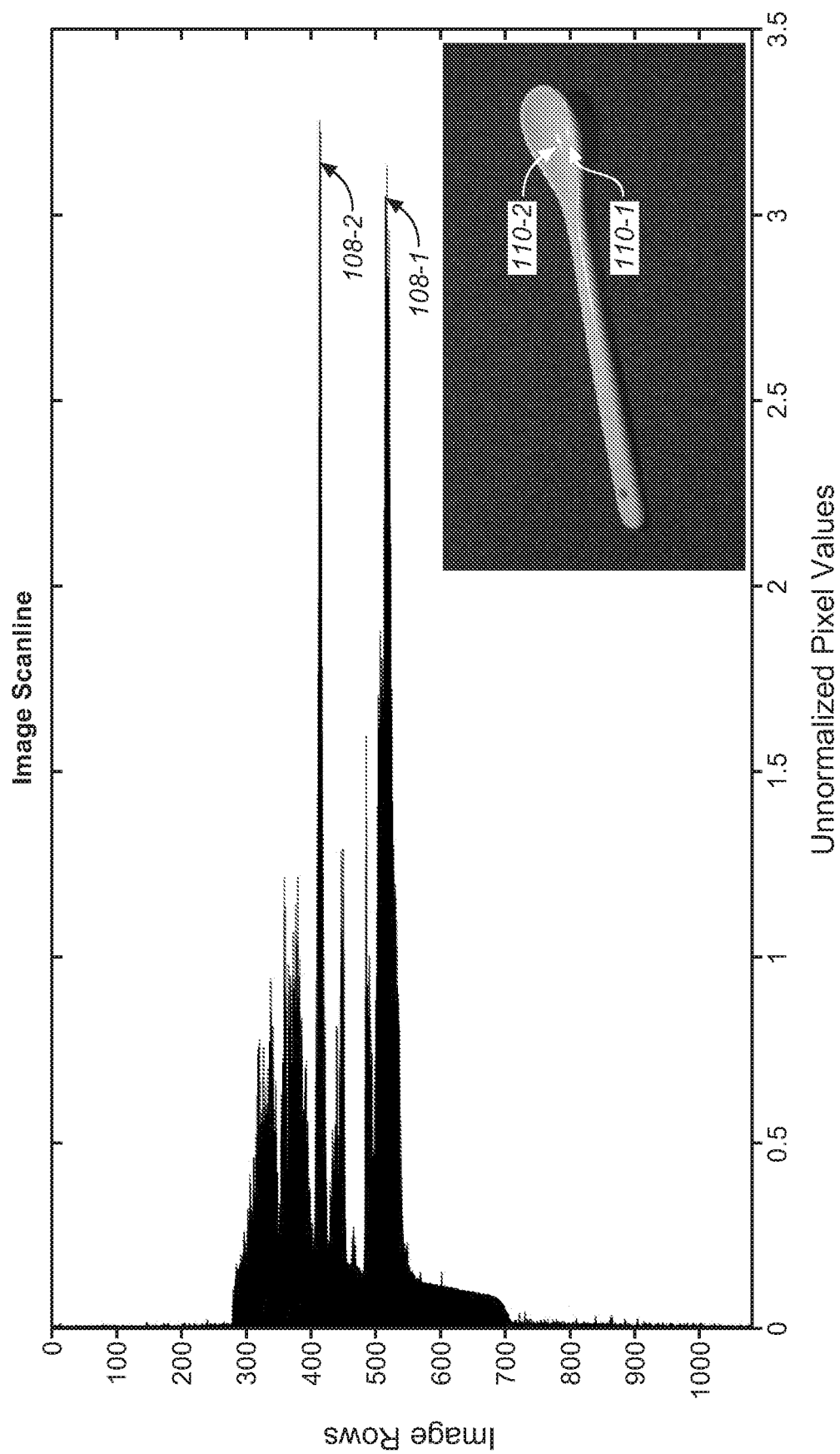
FIG. 1B illustrates an example histogram of luminance values or luma values used in detecting highlights in an image.

FIG. 1B illustrates an example histogram of luminance values or luma values used in detecting highlights in an image. The image may comprise diffuse white reflections from one or more reflective objects (e.g., to a human observer, etc.) such as spoons, walls, etc., present in the image. The image may also comprise highlights such as one or more of specular reflections (e.g., luminance values above a DW point, brighter than the diffuse white reflections, etc.) that are caused by light reflected from shiny objects, emissives that are caused by self-light-emanating objects such as light emitters, light emitting diodes (LEDs), light bulbs, etc. Highlights such as emissives, etc., typically have higher luminance values than a DW point determined for an image. However, some highlights may have lower luminance values than the DW point.

Highlight management operations as described herein may or may not be performed for highlights (e.g., in photography, etc) with luminance values lower than a DW point of an image, if such highlights are detected in the image in a highlight detection algorithm. In some embodiments, highlight management operations are performed for highlights with luminance values lower than a DW point of an image to a lesser extent, for example, to an extent that is proportional to or scaling with a probability or confidence level that a particular image detail is determined to be a highlight, etc.

Highlights in an image may be represented by large or sharp spikes in pixel brightness in specific regions of the image. This spike or large increase as compared with pixel brightness in other regions of the image may be detected by analyzing a spatial distribution of luminance values or luma values in the image, in histograms of luminance values or luma values along scanlines (e.g., horizontal rows of an image frame or a portion thereof, vertical columns of an image frame or a portion thereof, etc.). For example, as shown in FIG. 1B, two specular reflections (e.g., 110-1 and 110-2, etc.) on a spoon in an image may be detected based on or represented by two corresponding prominent spikes (e.g., 108-1 and 108-2, etc.) in a histogram of luminance values or luma values of image scanlines A highlight mask that indicates highlights in the (original) image may be specified or generated based on analyzing distributions, histograms, etc., of luminance values or luma values.

Figure 1C:
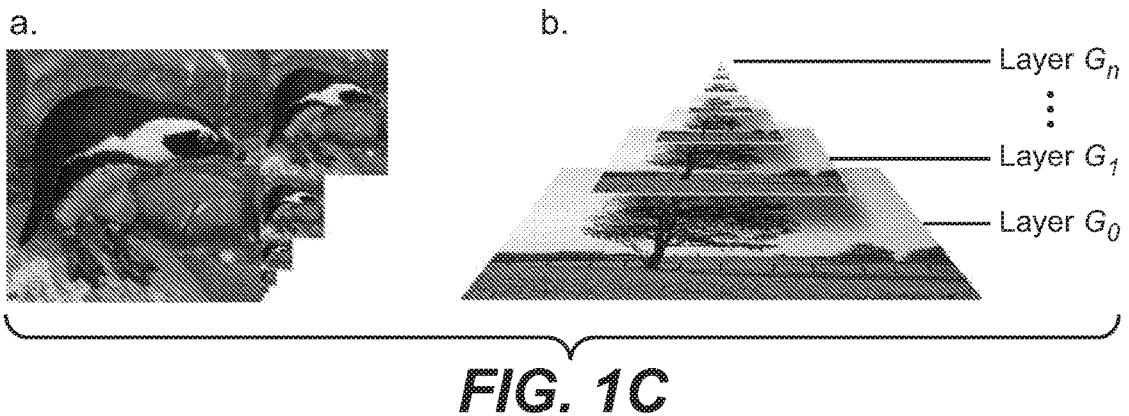
FIG. 1C through FIG. 1E illustrate example Gaussian images, difference-of-Gaussian images and highlight images used to detect highlights in an image.
Figure 1D:
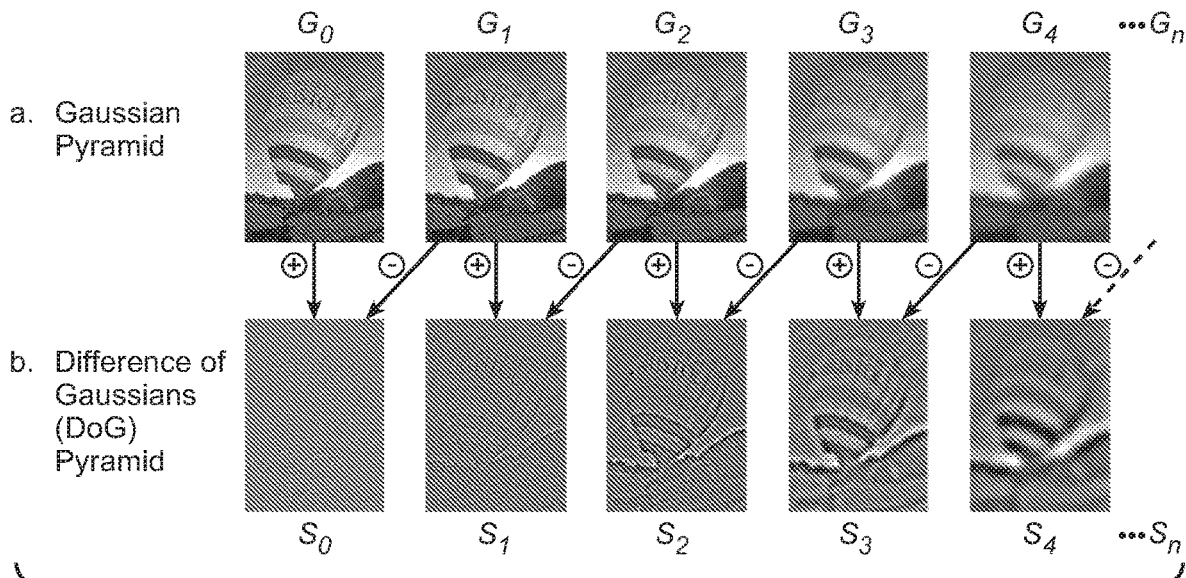
Figure 1E:
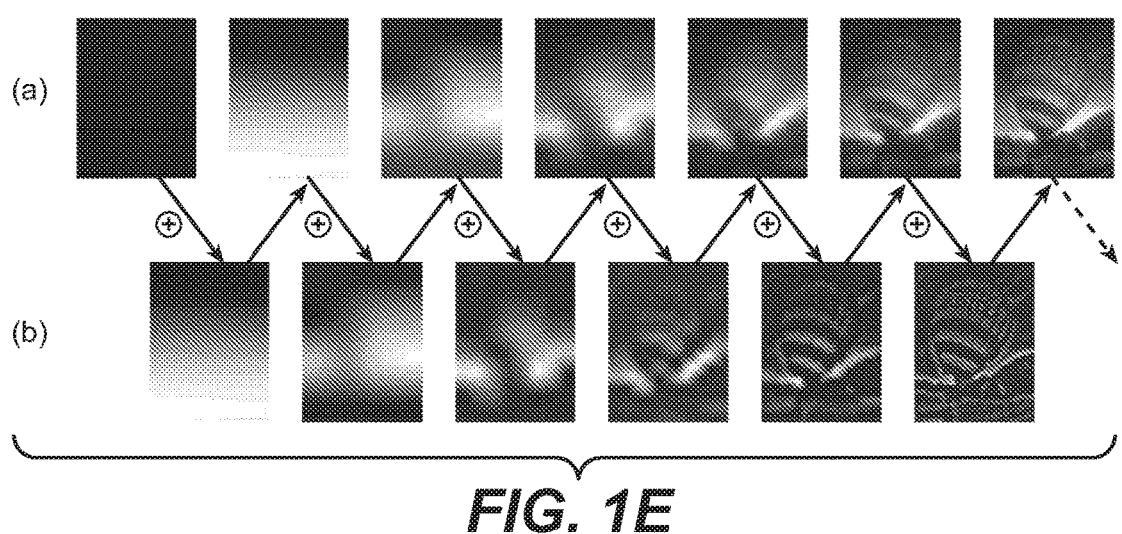

FIG. 1C through FIG. 1E illustrate example hierarchies or sequences of Gaussian images, difference-of-Gaussian images and highlight images constructed from an image that can be used to detect highlights in the image. A detailed discussion of using Gaussian images and difference-of-Gaussian images to detect highlights or edges of highlights can be found, for example, in Chapter 7 "Identifying Perceived Lightsources" of Timo Kunkel, *Colour Appearance Modelling for Digital Imaging Pipelines* (2010) (PhD Thesis, University of Bristol), the contents of which are hereby incorporated by reference.

In some embodiments, a pyramid (or hierarchy) of Gaussian images can be created by convolving an image with a convolution kernel (e.g., a Gaussian kernel, etc.) followed by subsampling each Gaussian image by a numeric factor (e.g., 2, etc.). FIG. 1C (a) and FIG. 1C (b) illustrate two example pyramids of Gaussian images respectively generated from two images by Gaussian convolution and subsampling operations.

Subtraction operations can be applied to between images in each pair of successive Gaussian images in a pyramid (or hierarchy) of Gaussian images such as shown in FIG. 1D(a) to generate difference-of-Gaussians (DoG) images that form a hierarchy of DoG images as shown in FIG. 1D(b). In some embodiments, each DoG image in the hierarchy comprises respective differences or gradient values derived from luminance values or luma values in a corresponding pair of successive Gaussian images in the hierarchy of Gaussian images. Negative differences or gradient values in the DoG image may be set to zero as these negative values may not indicate directions or trends towards an increasing of brightness. On the other hand, positive differences or gradient values in the DoG image are preserved as these positive values may indicate directions or trends towards brighter pixel values (in the original image) that potentially can represent highlights.

In some embodiments, a sequence of (potential) highlight images as illustrated in FIG. 1E(a) is further constructed step-by-step by adding up the positive part (comprising positive differences or gradient values) of each DoG image in a hierarchy of the DoG images as illustrated in FIG. 1E(b). In this stepwise construction of the sequence of highlight images of FIG. 1E (a), each of the DoG images of FIG. 1E (b) may be assigned a respective weight factor. A highlight mask that indicates highlights in the (original) image may be specified or generated based on a highlight image (e.g., the rightmost highlight image, the last highlight image, a converged highlight image, a highlight image after reaching a set number of iterations, etc.) in the sequence of highlight images.

Techniques as described herein can implement one or more of a wide variety of highlight detection algorithms to detect highlights of an image and classify/group highlights into different highlight groups. In various embodiments, highlight detection algorithms may be based on one or more of histograms, difference-of-Gaussians images, Fresnel reflection coefficient computations, color image segmentation techniques, color coding analyses, pyramids of images of different spatial resolutions, relative energy analyses, etc. Additionally, optionally, or alternatively, user input that specifies a DW point (e.g., by identifying a specific portion of an image as diffuse white of the image, etc.), approximate regions in which highlights of interest exist, etc., can be received and incorporated into these highlight detection algorithms. Accordingly, a highlight mask that indicates highlights in an image may be specified or generated by applying one or more of the highlight detection algorithms individually or in combination.

3. Classification of Highlights

Figure 2:
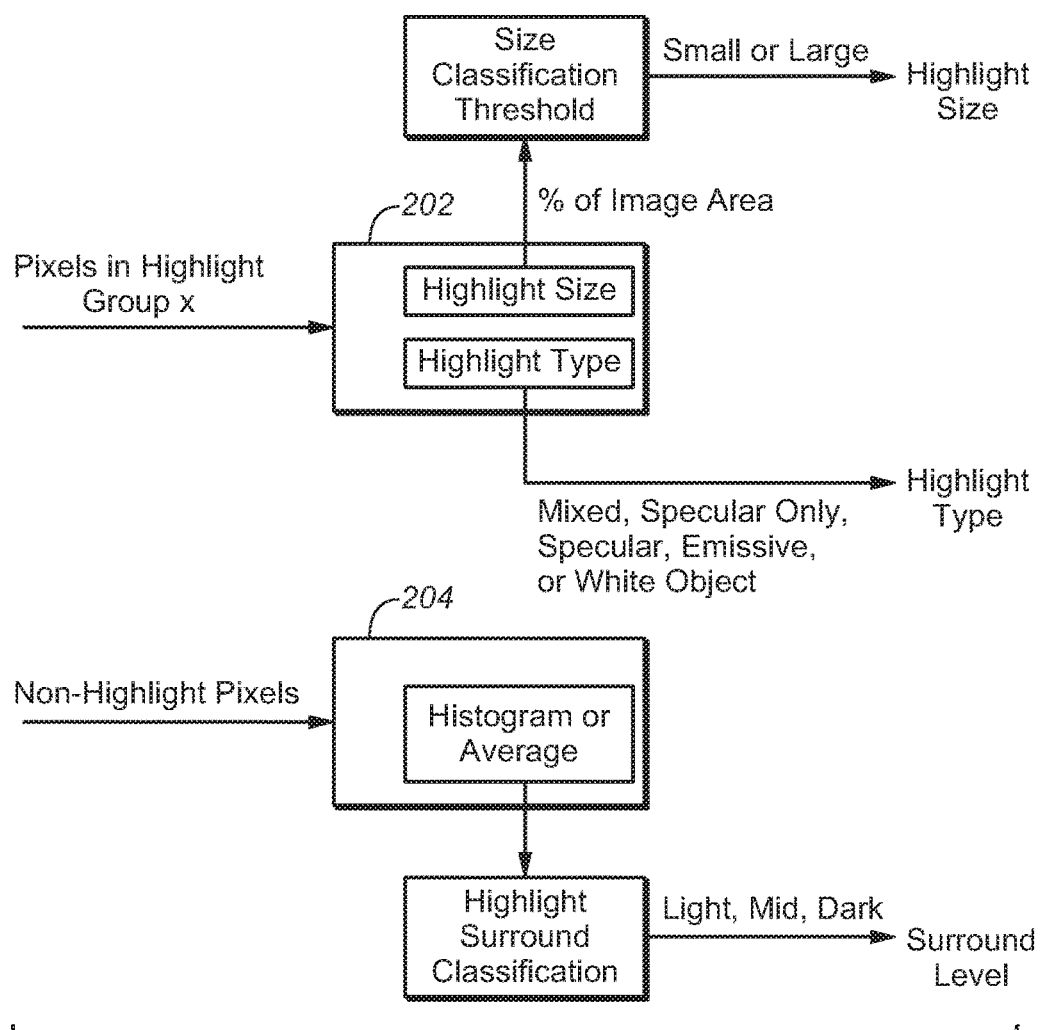
FIG. 2 depicts example classifications of highlights as well as of non-highlight regions in an image.

FIG. 2 depicts example classifications of highlights (e.g., within a highlight group, across one or more highlight groups, etc.) as well as of non-highlight regions (e.g., overall, in specific regions, in regions surrounding a highlight, in regions surrounding a highlight group, etc.) in an image. In some embodiments, an image processor (not shown) comprises a highlight analyzer 202 that is implemented with one or more computing devices. In some embodiments, the highlight analyzer (202) can be configured to receive (e.g., from the highlight identifier (104), etc.) one or more highlight descriptors and pixel values for one or more sets of pixels for one or more highlight groups in an image.

In some embodiments, the highlight analyzer (202) is configured to analyze each (highlight group) of the highlight groups in the image and classifies the highlight group according to its highlight type and highlight size as derived from a highlight descriptor and pixel values for a set of pixels for the highlight group, pixels values of its surrounding pixels, pixel values of the image, etc. One or more of a wide variety of available computer vision techniques, available image processing techniques, available highlight detection algorithms, etc., can be used by the highlight analyzer (202) to perform analyses and classifications of a highlight group as described herein. In some embodiments, the highlight analyzer (202) comprises a first analysis module configured to determine a highlight size, a second analysis module configured to determine a highlight type, etc., for each of the highlight groups. Additionally, optionally, or alternatively, the highlight analyzer (202) may comprise other analysis modules configured to determine other attributes/types associated with one or more highlight groups in the image.

Highlight sizes determined for the highlight groups in the image can be compared, for example by a highlight size comparator implemented with the first analyzer module, with a (e.g., fixed, pre-configured, image-dependent, scene-dependent, region-dependent, dynamic, adaptive, etc.) highlight size threshold. The highlight sizes and the highlight size threshold may be based on individual or aggregated areas of the highlight groups. Additionally, optionally, or alternatively, the highlight sizes and the highlight size threshold may be based on individual or aggregated total numbers of pixels in the highlight groups. Based on results of comparing the highlight sizes with the highlight size threshold, the highlight groups in the image can be classified individually or in aggregation as small, large, etc.

Highlight types may include, but are not necessarily limited to only, mixed, specular only, specular, emissive, white object, etc. In an example implementation, a "mixed" highlight type means that an image has multiple light sources, often with different scene areas or sections having different levels of lighting (e.g., different luminance levels above diffuse reflections, etc.). A "specular only" highlight type means that the image has specular reflections but no emissives visible. A "specular" highlight type means that, while the image has specular highlights as well as emissives, a particular highlight group is comprised of just specular reflections. An "emissive" highlight type means that such highlights are from self-emanating objects, like the sun, light bulbs, fire, neon, lava, glow-tubes, etc. A "white object" highlight type means that a highlight portion or region such as a specular reflection, an emissive, etc., is immediately adjacent with, or surrounded by, one or more white regions; for example, this may occur if the specular reflection was off of a white object, or the emissive was immediately surrounded by a white region, where in both cases white regions are diffuse reflections. Additionally, optionally, or alternatively, other variations, combinations, etc., of highlights may be used to define other highlight types.

In some embodiments, an image processor (not shown) comprises a non-highlight analyzer 204 that is implemented with one or more computing devices. In some embodiments, the non-highlight analyzer (204) can be configured to receive non-highlight pixel labels and pixel values for the pixels that are classified as non-highlight in the image (e.g., from the non-highlight labeler (106), etc.).

The non-highlight analyzer (204) can classify non-highlight regions (or portions) in the image into one or more overall luminance levels; in other words, the non-highlight regions in the image are generally classified by the overall luminance levels. In an example, the non-highlight regions in the image can be classified based on an average picture level (APL) that is computed based on luma values as represented in a code value domain (e.g., code values as defined in a perceptual quantized color space, etc.). In another example, the non-highlight regions in the image can be classified based on an average luminance level (ALL) that is computed based on all luminance values represented in the image.

Additionally, optionally, or alternatively, the non-highlight analyzer (204) can compute or assess an overall luminance levels of one or more non-highlight local portions or regions in an image such as non-highlight regions surrounding one or more highlights, non-highlight regions surrounding one or more highlight groups, etc. In an example implementation, the non-highlight analyzer (204) computes a histogram of code values or luminance values for some or all of the non-highlight pixels in the image and classify the non-highlight regions (or portions) in the image into the overall luminance levels based on the histogram.

In some embodiments, the overall (e.g., region-based, image-based, etc.) luminance levels determined for the image can be analyzed, for example by the non-highlight analyzer (204) to determine one or more highlight surround levels for one or more highlight groups in the image. In some embodiments, a highlight surround level is determined for each individual highlight group. In some embodiments, a highlight surround level is determined collectively for all highlight groups (e.g., in the image, in a region of the image, etc.).

Highlight surround levels may include, but are not necessarily limited to only, a high highlight surround level (or simply denoted as "high"), a low highlight surround level (or simply denoted as "low"), a middle highlight surround level (or simply denoted as "mid"), etc. The non-highlight analyzer (204) may be configured with one or more highlight surround thresholds to be used for comparing with the overall luminance levels in the image for the purpose of determining highlight surround levels.

4. Highlight Gains and Scaling of Luminance Amplitudes

Figures 3, 3A:
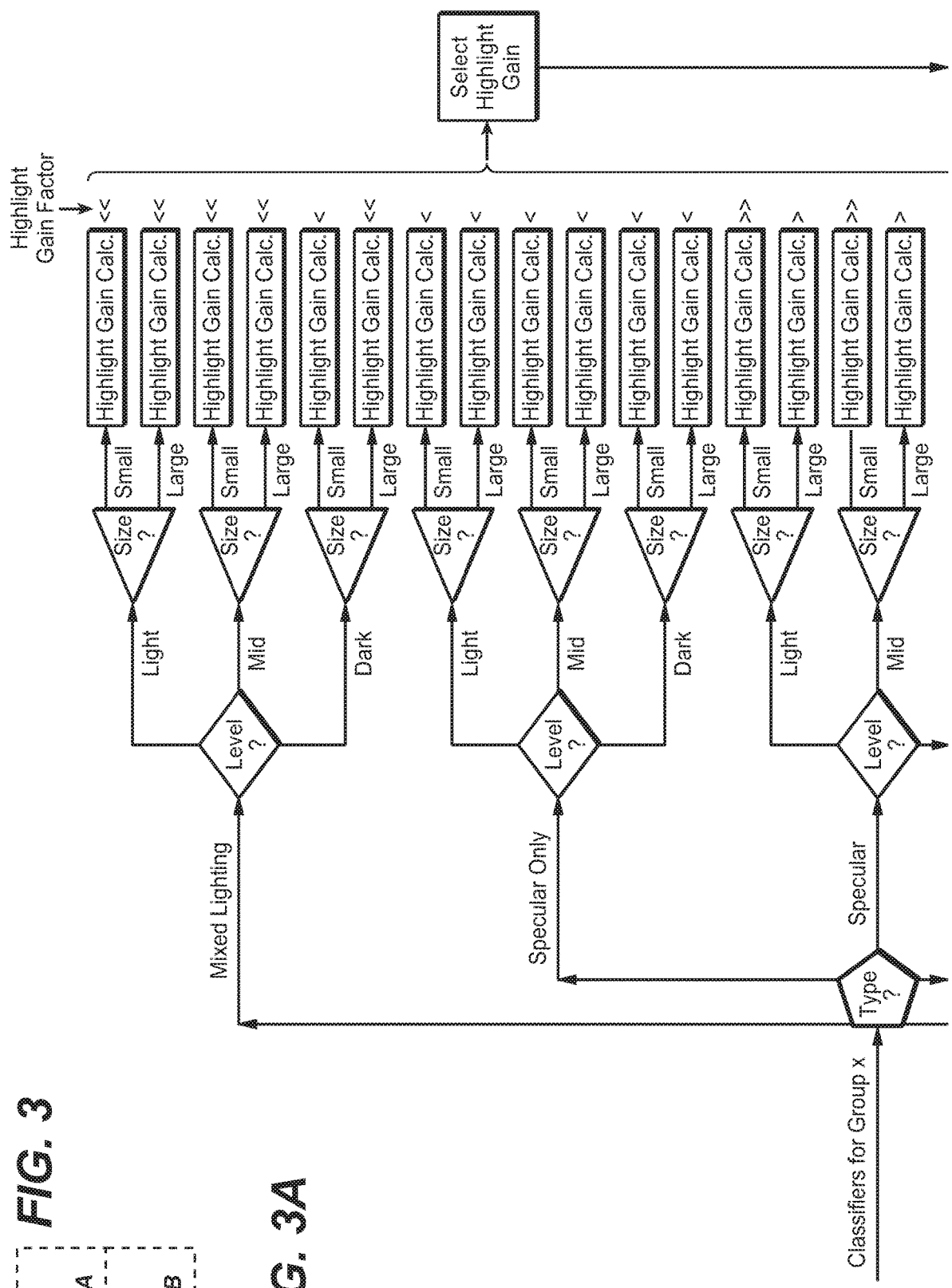
FIGS. 3, 3A and 3B depict example selections/calculations of highlight gains for highlights in highlight groups and corresponding scalings of luminance amplitudes for pixels in the highlight groups based on the selected highlight gains.
Figure 3B:
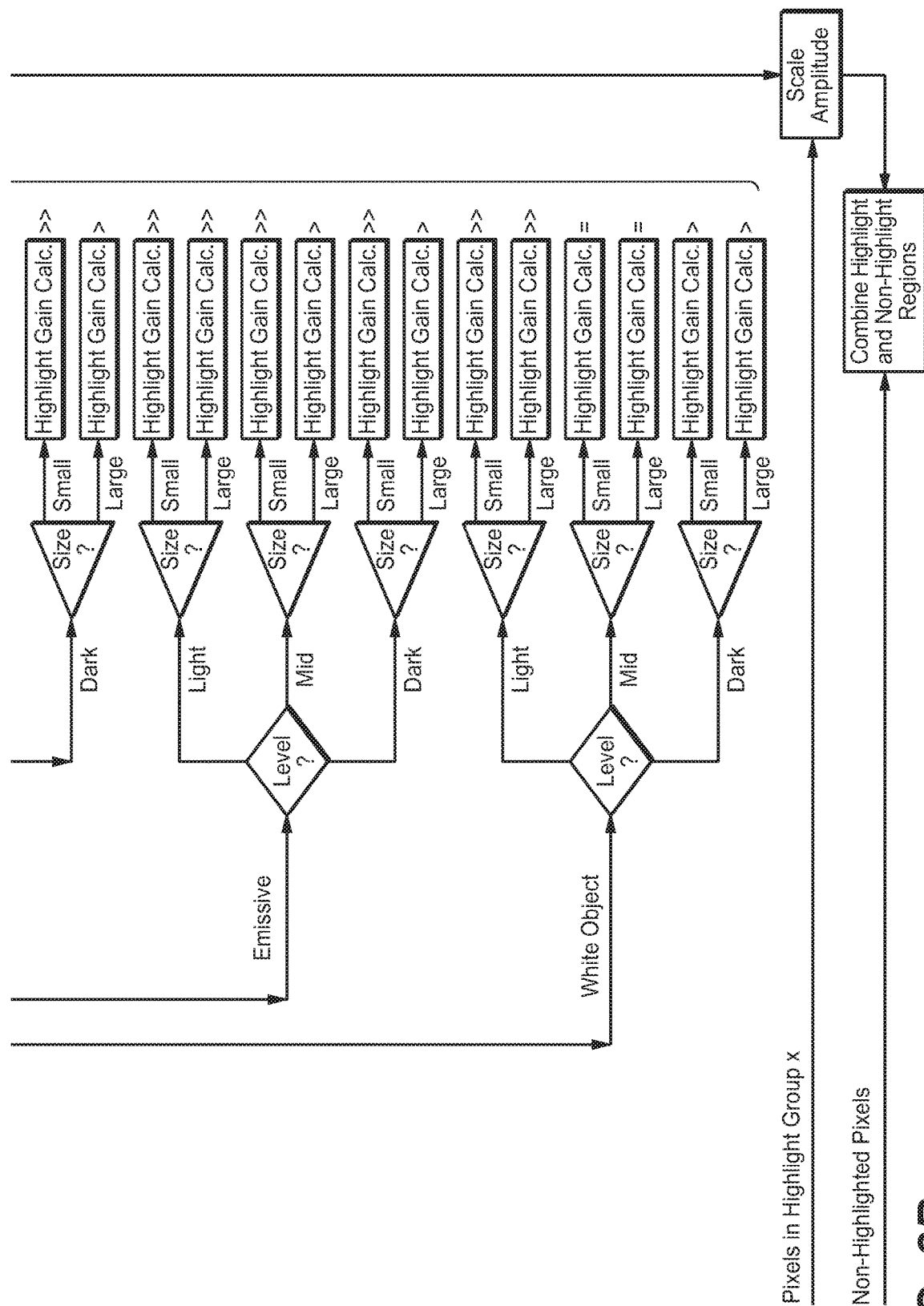

FIG. 3 depicts example selections/calculations of highlight gains for highlights in highlight groups and corresponding scalings of luminance amplitudes for pixels in the highlight groups based on the selected highlight gains. In some embodiments, the highlight gains can be selected based at least in part on characteristics associated with a media program, a scene or a group of pictures in a media program, an image, one or more regions in an image, a highlight, a highlight group, one or more highlight surrounds of a highlight or a highlight group, etc.

Under techniques as described herein, a highlight management table may be set up to control highlight management/rendering, such as determining highlight gains for highlights and highlight groups, etc. The highlight management table may be constructed at least in part from information obtained in viewer preference studies. The viewer preference studies can be designed to capture qualitative and/or quantitative user preferences in highlight management/rendering among a user population of viewers, photographers, colorists, video engineers, etc. A set of training data comprising images with various highlight types, highlight sizes, image-wide or region-based average picture levels (APLs), etc., may be used in the viewer preference studies. In some embodiments, luminance amplitudes in highlights or highlight groups of an image may be increased, decreased, or otherwise adjusted individually or in combination to various extents. User responses regarding a number of perceptual aspects of the image with or without various highlight manipulations may be collected and analyzed to determine correlations, relationships, etc., qualitatively or quantitatively between trends represented in the user responses and highlight manipulations as functions of various highlight attributes. The highlight manipulations used in the user preference studies can be selected from a wide variety of image processing techniques of different levels of complexity and accuracy. In some embodiments, the viewer preference studies generate cumulative density functions (CDFs) that relate different scalings of luminance amplitudes in highlights to percentages of viewers that are satisfied by the different scaling of luminance amplitudes for images with different image characteristics. Example image characteristics used to CDFs as described herein may include, but are not limited to only, any of: luminance levels of highlight surrounds such as dark, light, mid, mixed, etc.; highlight sizes (e.g., visually assessed, programmatically identified/determined, etc.); dispersedness (e.g., disjoint, non-contiguousness, etc.) or contiguousness of highlights; numbers of highlights; average sizes of highlights; image-wide or region-based contrasts; average local contrasts in highlight surrounds around highlights; highlight types (e.g., presence or absence of emissives, presence or absence of white object specular reflections, presence or absence of non-white object specular reflections, presence or absence of multiple different highlight types, etc.); etc.

In some embodiments, the CDFs that show qualitative and/or quantitative trends in highlight brightness preferences as functions of highlight attributes may be summarized in the highlight management table. In some embodiments, input parameters to the highlight management table (e.g., the rows and columns categories, etc.) are highlight attributes or highlight classifiers (which may include attributes or classifiers of highlight surrounds) selected from a set of candidate highlight attributes or highlight classifiers involved in the user preference studies. An example highlight management table is shown as follows:

TABLE 1

|  |  | Highlight Size | | Highlight Type | | | | | Highlight Surround Level | | |
| --- | --- | --- | --- | --- | --- | --- | --- | --- | --- | --- | --- |
|  |  | Small | Large | Mixed Lighting | No Light Source | Specular | Visible Light Source | White Object | Light | Mid | Dark |
| Highlight Surround Level | Light | >> | << |  |  |  |  |  |  |  |  |
|  | Mid | > | < |  |  |  |  |  |  |  |  |
|  | Dark | >> | > |  |  |  |  |  |  |  |  |
| Highlight Type | Mixed Lighting |  |  |  |  |  |  |  | << | < |  |
|  | No Light Source |  |  |  |  |  |  |  |  | < |  |
|  | Specular |  |  |  |  |  |  |  | > |  | >> |
|  | Visible Light Source |  |  |  |  |  |  |  | >> |  | > |
|  | White Object |  |  |  |  |  |  |  | >> | < |  |
| Highlight Size | Small |  |  | < | < | >> | >> | > |  |  |  |
|  | Large |  |  | << | < | > | > | > |  |  |  |

In TABLE 1, symbols "=", ">", ">>", "<", and "<<" represent highlight gain factors, as will be further explained in detail later.

In some embodiments, some or all highlight classifiers (or input parameters) as identified in the highlight management table are generated for each highlight group in an image, and used to select/calculate a highlight gain for the highlight group and determine a corresponding scaling of luminance amplitudes (e.g., in terms of luminance values, in terms of code values, etc.) for pixels in the highlight group.

In an example implementation, the highlight classifiers for a highlight group comprise a highlight type, a highlight surround level and a highlight size, as illustrated in TABLE 1. The highlight type or simply "type" is information accompanying the highlight group or pixels therein. The highlight surround level or simply "level" may refer to the luminance level of all non-highlight regions of the image. Additionally, optionally, or alternatively, the "level" may only be calculated by pixel values in regions surrounding (e.g., bordering, etc.) the highlight group. The highlight size or simply "size" refers to a spatial size of highlights as represented by the highlight group. In some embodiments, highlights in the highlight group may be processed with a single highlight gain; the "size" may refer to a collective spatial size of all highlights in the highlight group. In some other embodiments, individual highlights in the highlight group may be processed with individual highlight gains; the "size" may refer to an individual spatial size of an individual highlight in the highlight group. A highlight size (e.g., a large highlight size, a small highlight size, etc.) can be determined for a highlight group by comparing a total number of pixels, a total spatial area occupied by pixels, etc., in the highlight group with a (e.g., fixed, pre-configured, image-dependent, scene-dependent, region-dependent, dynamic, adaptive, etc.) highlight size threshold. In a first non-limiting example, a threshold area size such as an L20 patch, which is defined as 20% of each of horizontal and vertical dimensions of a display panel and thus amounts to 4% of the image area of the display panel, may be used to determine whether a highlight size is large or small. In a second non-limiting example, a threshold area size, which is determined based on viewer preference studies, may be used to determine whether a highlight size is large or small.

As shown in FIG. 3, different combinations of highlight classifiers may lead to different gain factors that are to be applied to highlights in highlight groups. In some embodiments, the different highlight gain factors may be represented by symbols "=", ">", ">>", "<", "<<", etc. Additionally, optionally, or alternatively, in some embodiments, other highlight gain factors (e.g., "<<<", ">>>", etc.) may be represented in a highlight management table.

The symbol "=" means that a null gain factor is applied to a highlight in a highlight group by highlight management operations as described herein, relative to (or on top of) possible changes/gains introduced in other processing operations such as display mapping, tone mapping, inverse tone mapping, etc., for the overall image.

The symbol ">" means that a first positive gain factor is applied to a highlight in a highlight group by highlight management operations as described herein, relative to (or on top of) possible changes/gains introduced in other processing operations such as display mapping, tone mapping, inverse tone mapping, etc., for the overall image. The symbol ">>" means a second positive gain factor is applied to a highlight in a highlight group by highlight management operations as described herein, relative to (or on top of) possible changes/gains introduced in other processing operations such as display mapping, tone mapping, inverse tone mapping, etc., for the overall image, where the second positive gain factor is (e.g., substantially, much, 50%, twice, etc.) higher than the first positive gain factor.

Similarly, The symbol "<" means that a first negative gain factor is applied to a highlight in a highlight group by highlight management operations as described herein, relative to (or on top of) possible changes/gains introduced in other processing operations such as display mapping, tone mapping, inverse tone mapping, etc., for the overall image. The symbol "<<" means a second negative gain factor is applied to a highlight in a highlight group by highlight management operations as described herein, relative to (or on top of) possible changes/gains introduced in other processing operations such as display mapping, tone mapping, inverse tone mapping, etc., for the overall image, where the second negative gain factor is (e.g., substantially, much, 50%, twice, etc.) lower than the first negative gain factor.

These gain factors can be used to select different highlight gains (e.g., in numeric values, in ratios, as multiplicative factors, as exponents, etc.) to scale luminance amplitudes of highlights of images. Highlight gains for a specific highlight or a specific highlight group in an image may be set to different values for different display applications, for different available dynamic ranges, for different display parameters associated with different display devices, etc. For example, in a TV display application of rendering images in a home-based TV may be scaled with relatively large highlight gains to a relatively high dynamic range supported by the TV display application. In comparison, in a cinema display application of showing a movie in a cinema, luminance amplitudes of highlights in images, luminance amplitudes of highlights in images may be scaled with relatively small and even negative highlight gains to a relatively narrow dynamic range supported by the cinema display application.

By way of example and not limitation, for a display capable of a dynamic range no less than 4000 nits and for input images with luminance values no more than 1000 nits, the first positive gain factor (">") may be used to select a highlight gain approximately equal to two (2), whereas the second positive gain factor (">>") may be used to select a highlight gain approximately equal to four (4). Similarly, the first negative gain factor ("<") may be used to select a (negative) highlight gain approximately equal to one half ($\frac{1}{2}$), whereas the second negative gain factor ("<<") may be used to select a (negative) highlight gain approximately equal to one quarter ($\frac{1}{4}$).

In some embodiments, an image processor as described herein may be configured to use the highlight size and the highlight surround level for a specific highlight (or a specific highlight group) to select a gain factor for the specific highlight (or highlight group). As illustrated in TABLE 1, in response to determining that the highlight size is "small" (e.g., no larger than a pixel number threshold, no larger than a pixel area threshold, no larger than a pixel percentile threshold, etc.) and that the highlight surround level is "light" (e.g., higher luminance level than a high luminance level threshold configured for non-highlight pixels, etc.), the image processor may be configured to select the second positive gain factor (">>"). In response to determining that the highlight size is "large" (e.g., larger than the pixel number threshold, larger than the pixel area threshold, smaller than the pixel percentile threshold, etc.) and that the highlight surround level is "light", the image processor may be configured to select the second negative gain factor ("<<"). In response to determining that the highlight size is "small" and that the highlight surround level is "mid" (e.g., a luminance level between a low luminance level threshold configured for non-highlight pixels and the high luminance level threshold, etc.), the image processor may be configured to select the first positive gain factor (">"). In response to determining that the highlight size is "large" and the highlight surround level is "mid", the image processor may be configured to select the first negative gain factor ("<"). In response to determining that the highlight size is "small" and that the highlight surround level is "dark" (e.g., a luminance level below the low luminance level threshold, etc.), the image processor may be configured to select the second positive gain factor (">>"). In response to determining that the highlight size is "large" and the highlight surround level is "dark", the image processor may be configured to select the first positive gain factor (">").

In some embodiments, an image processor as described herein may be configured to use the highlight size and the highlight type for a specific highlight (or a specific highlight group) to select a gain factor for the specific highlight (or highlight group). As illustrated in TABLE 1, in response to determining that the highlight size is "small" and that the highlight type is "mixed lighting", the image processor may be configured to select the first negative gain factor ("<"). In response to determining that the highlight size is "large" and that the highlight type is "mixed lighting", the image processor may be configured to select the second negative gain factor ("<<"). In response to determining that the highlight size is "small" or "large" and that the highlight type is "no light source", the image processor may be configured to select the first negative gain factor ("<"). In response to determining that the highlight size is "small" and that the highlight type is "specular" or "visible light source," the image processor may be configured to select the second positive gain factor (">>"). In response to determining that the highlight size is "large" and that the highlight type is "specular" or "visible light source," the image processor may be configured to select the first positive gain factor (">"). In response to determining that the highlight size is "small" or "large" and that the highlight type is "white object", the image processor may be configured to select the first positive gain factor (">").

In some embodiments, an image processor as described herein may be configured to use other classifiers for a specific highlight (or a specific highlight group) to select a gain factor for the specific highlight (or highlight group). As illustrated in TABLE 1, the image processor may be configured to use the highlight type and the highlight surround level for a specific highlight (or a specific highlight group) to select a gain factor for the specific highlight (or highlight group). Additionally, optionally, or alternatively, in some embodiments, the image processor may be configured to use one, two, three or more classifiers for a specific highlight (or a specific highlight group) to select a gain factor for the specific highlight (or highlight group). For example, in some embodiments, all of the highlight type, highlight size, and the highlight surround level for a specific highlight or a specific highlight group may be used as inputs/controls for the purpose of selecting a gain factor for the specific highlight (or highlight group).

In some embodiments, a highlight gain as selected based on a gain factor may be a multiplicative factor to be multiplied with a luminance amplitude (e.g., a relative luminance amplitude in relation to a reference luminance value such as a DW point, etc., that caps non-highlight regions of the image, etc.) of a highlight in an image for the purpose of scaling the luminance amplitude to a scaled luminance amplitude of the highlight in the image. Pixels within a highlight in the image may or may not be scaled uniformly with a highlight gain selected based on a gain factor.

In some embodiments, a highlight mask may be used to control applying one or more highlight gains to some or all of highlights in an image. The highlight mask may comprise masking values that distinguish non-highlight regions of the image from highlight groups of the image. In some embodiments, the highlight mask may comprise differential masking values in the highlight groups of the image. The masking values in the highlight mask can be used to control which pixels in the image are to be scaled by highlight scaling operations as described herein, which pixels in the image are not to be scaled by these operations, how much luminance values of pixels in a highlight are to be scaled with a highlight gain applicable to highlight attributes of the highlight, etc. For example, a highlight that is determined to be a specular reflection with a 90% confidence level may be scaled with a highlight gain for a highlight type of specular reflection multiplied by a masking value in the highlight mask that is proportional to or dependent on the 90% confidence level, whereas another highlight that is determined to be a specular reflection with a 50% confidence level may be scaled with the highlight gain multiplied by a different masking value in the highlight mask that is proportional to or dependent on the 90% confidence level.

After luminance values, including but not limited to luminance amplitudes, in highlights of the image are scaled (e.g., as controlled by a highlight mask, etc.) with one or more highlight gains each of which is selected based on a gain factor as described herein, pixels in the highlights with scaled luminance amplitude in the image are recombined with pixels in non-highlight regions of the image that are not scaled with the highlight gains. In some embodiments, the pixels in the non-highlight regions of the image may be left unchanged by highlight management operations as described herein. Additionally, optionally, or alternatively, highlight management techniques can operate in conjunction with non-highlight-specific processing operations such as display mapping, tone mapping, inverse tone mapping, etc., that may process and/change luminance values of both highlight and non-highlight pixels in an image.

In some embodiments, some or all of the highlights in the image may be represented as an addition (e.g., an additional image, a differential image, a residue image, etc.) to an underlying non-highlight image comprising non-highlight regions of the image. The addition to the underlying non-highlight image may comprise relative luminance values of pixels in the highlights of the image, wherein the relative luminance values are differences between absolution luminance values of the pixels in the highlights of the image and a reference luminance value (e.g., a luminance value that caps non-highlight regions of the image, a DW point, etc.).

In some embodiments, some or all of the highlights in the image may be represented as a partial highlight image of the (original) image. The partial highlight image, after luminance values therein are adjusted with highlight gains, can be combined with the rest of the image based on the highlight mask.

A highlight mask as described herein may be, but is not necessarily, a binary mask with one masking bit value (e.g., 1, true, etc.) indicating a pixel in highlights and the other masking bit value (e.g., 0, false, etc.) indicating a pixel in non-highlight regions. In some embodiments, the highlight mask may include graduations (e.g., 0, 1, . . . , N, wherein N is greater than 1, etc.) in masking values. In some embodiments, graduations or differential levels in the masking values of the highlight mask can be used to merge scaled highlights with their highlight surrounds in a realistic manner A highlight may comprise a texture with luminance, chroma or hue modulations that can be better preserved with a highlight mask with graduations or differential levels other than masking bit values. For example, a highlight may represent a traffic light that is covered with a textured glass lens over an actual light emitter, rather than a circle of a constant luminance value; such a highlight may be scaled with a highlight gain in combination with (e.g., multiplied with, etc.) graduations or differential levels in a highlight mask.

In some embodiments, the highlight mask may comprise one or more mask descriptors to indicate whether some or all of pixel values in the highlight mask are offset values (e.g., relative luminance values above a luminance value that caps reflective white regions of the image, etc.), absolute values, etc.

Based on the mask descriptors and masking values (e.g., binary, multi-valued, etc.) in the highlight mask, luminance values and/or chroma values in the highlight image may supersede or add to corresponding luminance values and/or chroma values in the (original) image to generate an overall image that comprises scaled luminance amplitudes of the highlights in the image.

In some embodiments, the highlight management operations as described herein may combine or recombine pixels in the highlights of the image with pixels in the non-highlight regions of the image and send the recombined image to an image rendering device/module for rendering the recombined image.

In some other embodiments, the highlight management operations as described herein may output non-highlight image data and highlight image data as separate data to an image rendering device/module, without actually combining or recombining pixels in the highlights of the image with pixels in the non-highlight regions of the image and sending the recombined image to an image rendering device/module for rendering the recombined image. For example, in embodiments in which an image rendering device such as a projector, etc., has a highlight projection setup separate from an overall image projection setup, the addition, the highlight image, the highlight mask, etc., as discussed above may be provided to the image rendering device for driving the separate highlight projection setup to render the highlights of the image, while the non-highlight image, etc., as discussed above may be provided separately to the image rendering device for driving the overall image projection setup to render the underlying non-highlight image, or the non-highlight regions of the image.

Figure 4A:
FIG. 4A and FIG. 4B illustrate example highlights and highlight mask.
Figure 4B:
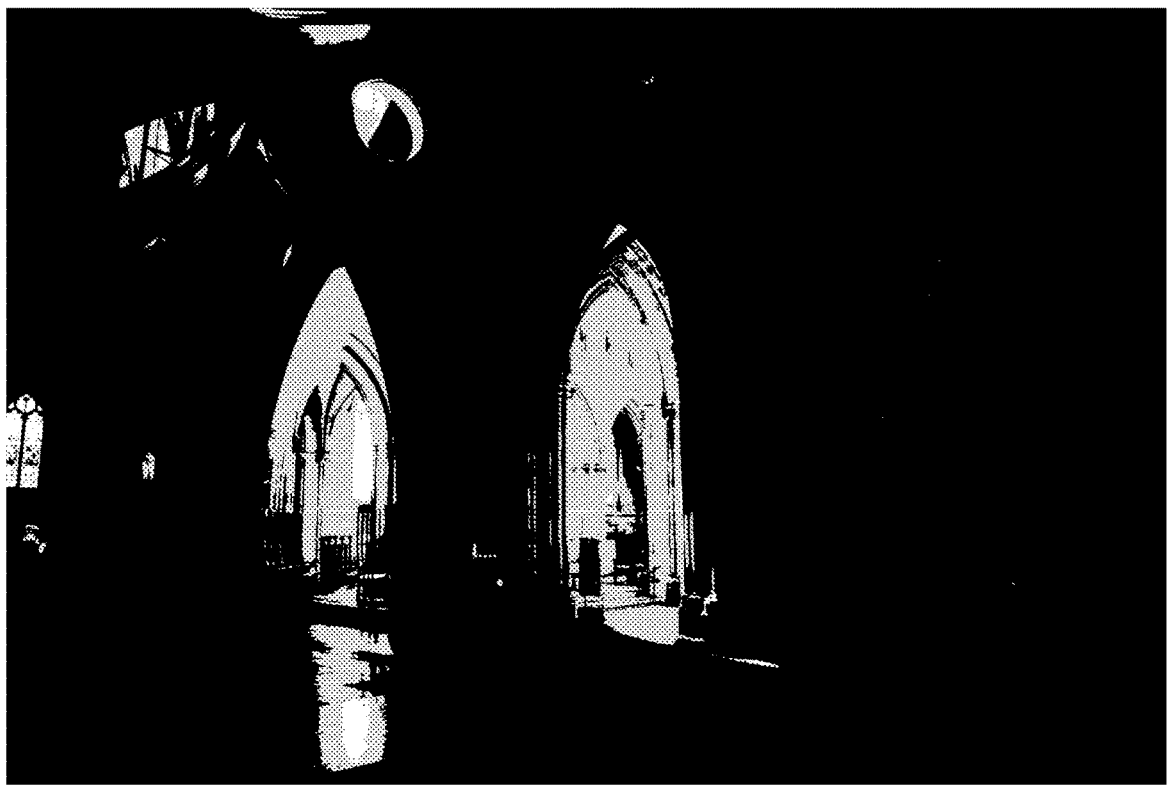

FIG. 4A illustrates an example image comprising highlights that may be scaled under techniques as described herein. FIG. 4B illustrates an example highlight mask for the image of FIG. 4A. In some embodiments, an image as described herein may comprise mixed highlights. For example, as illustrated in FIG. 4A and FIG. 4B, highlights in the image apart from non-highlight regions as represented by black regions in FIG. 4B can be divided into two different highlight groups. The very bright window regions in the image are treated as highlights (shown as white regions in FIG. 4B) in a first highlight group, whereas lesser bright walls (shown as gray regions in FIG. 4B) having a higher brightness level than the inner dark chambers in the same image are also treated as highlights, but are of a second different highlight group. Further, as both highlights can act as light sources to the remaining portions (or scene) in the image, highlights in the image are classified as mixed.

Additionally, optionally, or alternatively, the highlights in the image are grouped into the same highlight group in which the white regions are the strong part of the highlight group, and the gray regions are a lesser strong part of the highlight groups. A strong highlight in a highlight group may, but is not necessarily limited to, be scaled differently from a lesser strong highlight in the same highlight group.

Figure 5:
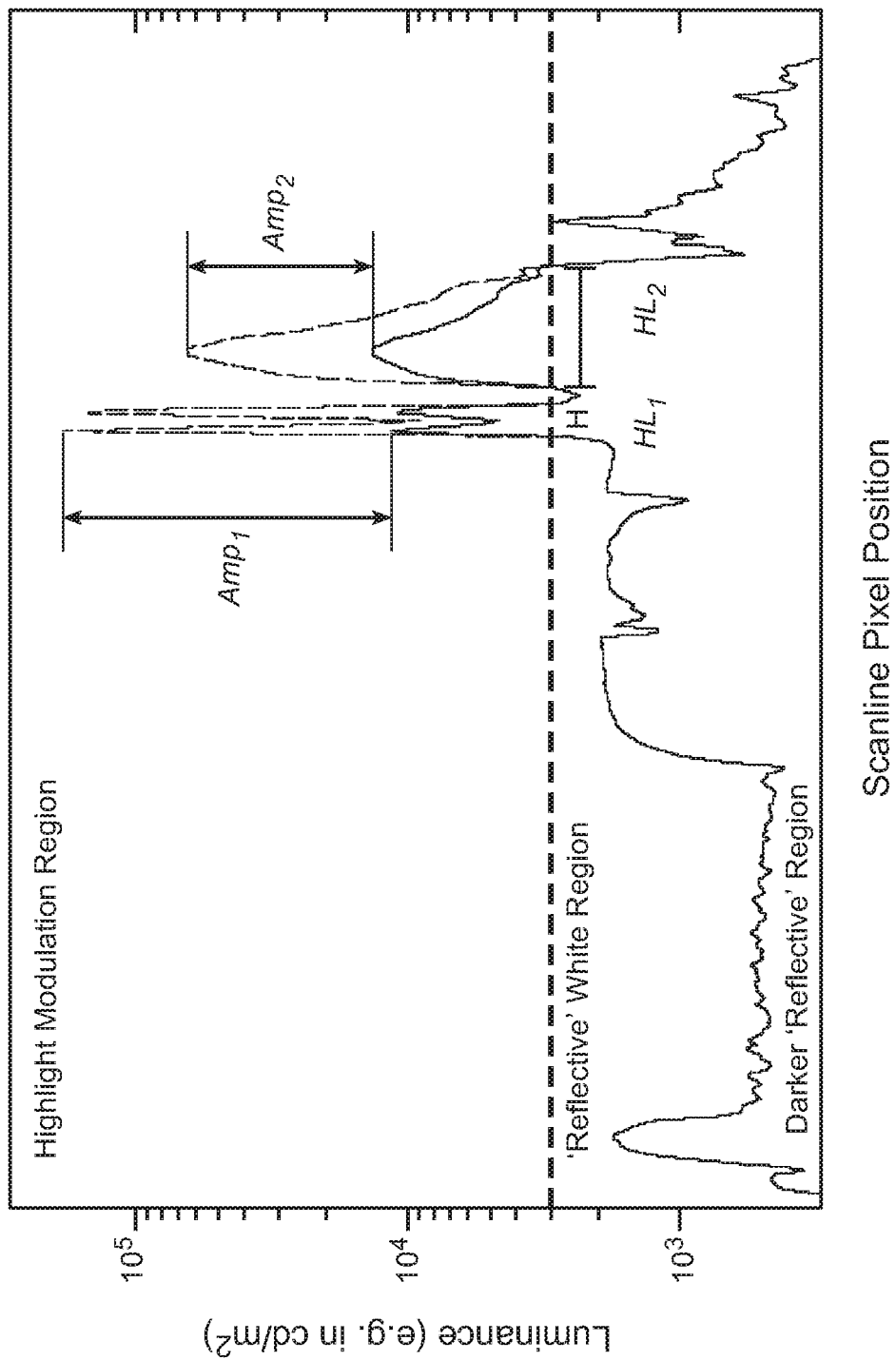
FIG. 5 illustrates an example scanline of an image in which luminance amplitudes of highlights may be adjusted.

FIG. 5 illustrates an example scanline of an image in which luminance amplitudes of highlights may be adjusted by highlight management techniques as described herein. The image comprises non-highlight regions (e.g., "Darker 'Reflective' Region", etc.) composed of pixels that have luminance values below a dashed line (e.g., a DW point, etc.) marked as "'Reflective' White Region" in FIG. 5. The image may also comprise highlights (e.g., "Highlight Modulation Region", etc.) composed of pixels that have luminance values at or above the dashed line. In FIG. 5, the scanline comprise non-highlight sections of pixels (located in non-highlight regions of the image) with luminance values below the dashed line, as well as two highlight sections of pixels (which are highlights in the image) with luminance values at or above the dashed line. In some embodiments, highlight management operations as described herein do not scale luminance values of pixels in the non-highlight regions of the image; for example in FIG. 5, luminance values of the pixels in the non-highlight sections of the scanline are left unchanged by these operations.

The two highlight sections in the scanline of FIG. 5 may respectively correspond to two different highlight groups ("HL1" and "HL2") in the image. The two highlight groups ("HL1" and "HL2") may have different luminance amplitudes. In some embodiments, highlight management operations as described herein scale luminance values of pixels in the highlights of the image.

Depending on highlight classifiers (e.g., as illustrated in FIG. 3) associated with each of highlight groups in the image, luminance amplitudes of the highlight groups may be respectively scaled by highlight gains derived at least in part from the highlight classifiers associated with the highlight groups.

In some embodiments, two or more highlight groups (e.g., "HL1" and "HL2", etc.)

in an image may be associated with the same values for highlight classifiers and the same highlight gain. In some embodiments, different highlight groups (e.g., "HL1", "HL2", etc.) in an image may be associated with different values (e.g., different highlight types, different sizes, different highlight surround levels, etc.) for highlight classifiers and different highlight gains (e.g., highlightGain1, highlightGain2, etc.).

A first highlight group (e.g., "HL1", etc.) in the image may have a first luminance amplitude to be scaled with a first highlight gain derived at least in part from first highlight classifiers associated with the first highlight group ("HL1"). Similarly, a second highlight group (e.g., "HL2", etc.) in the image may have a second luminance amplitude to be scaled with a second highlight gain derived at least in part from second highlight classifiers associated with the second highlight group ("HL2"). As illustrated in FIG. 5, scaling pixels in the first highlight group ("HL1") based on the first highlight gain may amount to adding an additional luminance value "AMP1" to the first luminance amplitude, whereas scaling pixels in the second highlight group ("HL2") based on the second highlight gain may amount to adding an additional luminance value "AMP2" to the second luminance amplitude.

It should be noted that pixels in a particular highlight group have different code values or luminance values. When a scaling factor or a corresponding highlight gain is applied to the pixels in the highlight group, these pixels have scaled code values or luminance values that vary from pixel to pixel in the highlight group. That is, scaled code values or scaled luminance values in a highlight or a highlight group may be of a varied profile rather than form a plateau.

Figure 6:
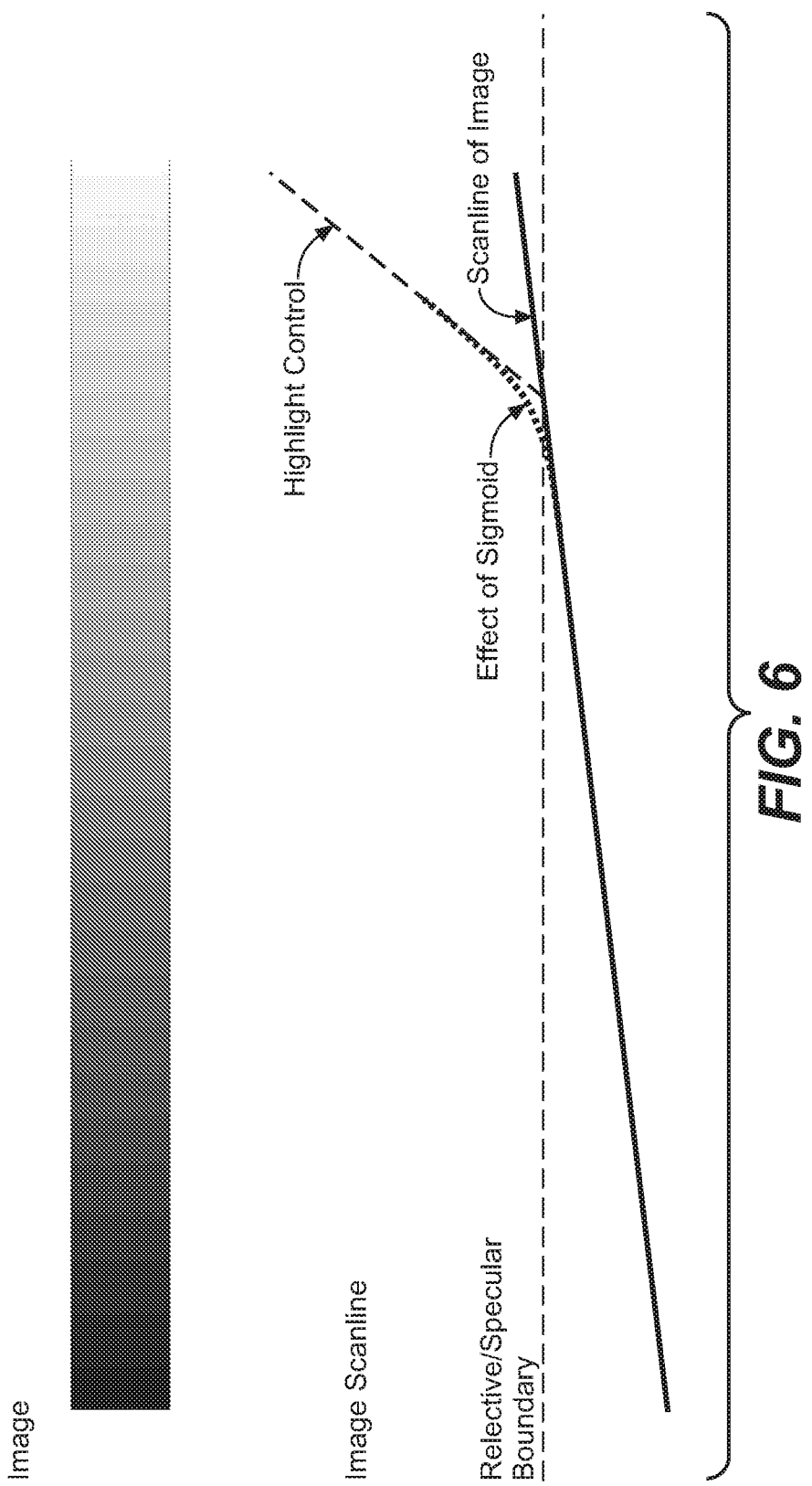
FIG. 6 illustrates an example blending function with a support extending over edges of a highlight.

As used herein, a highlight may have its own edge(s) that define(s) a spatial area for the highlight. In some embodiments, a steep edge (or even a binary edge) is desired and maintained under techniques as described herein. In some other embodiments, in order to avoid having unrealistic sharp edges around highlights that may be perceptible to viewers, a variable weight function such as a sigmoidal function, a blending function, an analytical function, a first-order differentiable function, etc., with a support extending over edges of a highlight may be used under techniques as described herein to smoothen amplitude scaling at interfaces of the highlight and its surround, as illustrated in FIG. 6. The variable weight function causes a transition region (e.g., within a distance such as 3 pixels, 5 pixels, 10 pixels, etc., from edges that define a spatial area for a highlight or a highlight group, etc.) to occur around the highlight, so that code values or luminance values at or near its edges are relatively consistent with characteristics associated with optical capture or computer graphics generation.

5. Highlight Processing

Figures 7A, 7B:
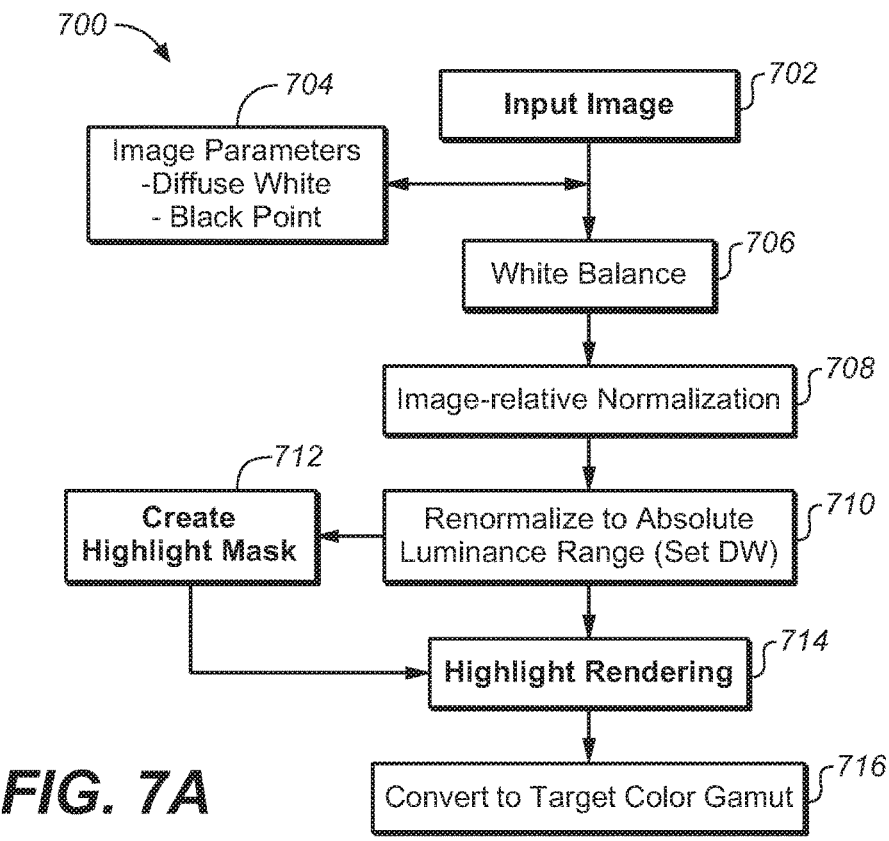
FIG. 7A and FIG. 7B depict example flow charts for highlight processing.

FIG. 7A and FIG. 7B depict example flow charts 700 and 750 for highlight processing. An image processor that comprises one or more computing processors implementing techniques as described herein may perform operations in the flow charts. In some embodiments, these operations may be broken down into a plurality of stages such as an image pre-processing stage, a highlight detection stage, a highlight management stage, etc. The image pre-processing stage may be performed for each input image in a sequence of input images before other stages processes the image.

In the example flow chart of FIG. 7A, in block 704, the image processor determines one or more image parameters of an input image (e.g., 702, etc.). The input image (702) may comprise image data in one or more channels (or components) of a color space such as an RGB color space, an XYZ color space, an YCbCr color space, an YDzDx color space, a perceptually quantized color space, etc. Examples of image parameters may include, but are not necessarily limited to, channel values for a DW point (or DW channel values) in the image (702), black point channel values in the image (702), etc. In some embodiments, the diffuse white channel values in the image (702) correspond to the dashed line of FIG. 5 for determining highlights in the image (702). Some or all of the image parameters may be used as input for subsequent image processing operations to be performed on the input image (702).

In some embodiments, some or all of the image parameters are derived through image processing automatically, programmatically, manually, etc. Additionally, optionally, or alternatively, user input (e.g., key input, touchpad input, voice input, gesture-based input, pen-based input, stylus-based input, mouse clicks, etc.) can be received and used for the purpose of determining an image parameter as described herein.

In block 706, the image processor generates a white balanced image by performing white balance compensation operations on the image (702), for example, to remove unrealistic color cast that may be introduced in image acquisition. In some embodiments, the white balance compensation operations may comprise illumination source color estimation operations using one or more of a variety of available techniques.

In block 708, the image processor performs image-relative normalization on the white balanced image to normalize the white balanced image into a normalized image in which the relative luminance value for the diffuse white channel values is one (1).

In block 710, the image processor renormalizes the normalized image into a renormalized image in which an absolute luminance value for the diffuse white (DW) point in the image (702) is set to a specific absolute luminance value. This specific absolute luminance value may be selected based on one or more selection factors. Examples of selection factors for selecting absolute luminance values for DW points in images may include, but are not necessarily limited to, any of: display applications, display devices, display technologies, dynamic ranges of display devices, image content in scenes or groups of pictures, image content represented in images, etc.

In block 712, the image processor detects highlights in the renormalized image, generates a highlight mask for highlight management/rendering, etc. The highlights may comprise pixels with luminance values or code values no less than a luminance value or code value represented by the diffuse white channel values. The image processor may classify or identify the detected highlights in the renormalized image into one or more highlight groups. One or more of a variety of highlight detection and classification techniques can be used by the image processor to identify a highlight group that comprises one or more highlights (or highlight regions) with one or more (e.g., common, perceptual, etc.) image characteristics such as colors, luminance levels, patterns, textures, spatial relationships, etc. A plurality of highlight classifiers such as a highlight type, a highlight surround level, a highlight size, etc., may be generated by the image processor for each highlight group in the image based on the image characteristics of the highlight group, attributes/characteristics of surround portions or the overall image, etc.

In block 714, the image processor uses the highlight mask, highlight classifiers, etc., generated from highlight detection in block 712, computes/selects one or more highlight gains for the highlights in the highlight groups, generates a scaled renormalized image by scaling luminance amplitude of the highlight groups in the renormalized image, etc. One or more highlight classifiers of a highlight group can be used as input to select/calculate a highlight gain for the highlight group for pixels in the highlight group.

In block 716, the image processor converts the scaled renormalized image to an output image into a target color gamut supported by a target display application, a target display device, etc. The target color gamut may be in a target color space which may or may not the same as the color space in which the input image (702) is represented.

In the example flow chart of FIG. 7B, in block 754, the image processor determines one or more image parameters of an input image. The input image may comprise image data in one or more channels (or components) of a color space such as an RGB color space, an XYZ color space, an YCbCr color space, an YDzDx color space, a perceptually quantized color space, etc. For the purpose of illustration, the input image represents an input RGB image (e.g., 752, etc.) in an RGB color space. Examples of image parameters may include, but are not necessarily limited to, RGB values for a diffuse white (DW) point (or DW RGB values) in the input RGB image (752), black point RGB values in the input RGB image (752), etc. In some embodiments, the diffuse white RGB values in the input RGB image (752) corresponds to the dashed line of FIG. 5 for determining highlights in the input RGB image (752). Some or all of the image parameters may be used as input for subsequent image processing operations to be performed on the input RGB image (752).

In some embodiments, some or all of the image parameters are derived through image processing automatically, programmatically, manually, etc. Additionally, optionally, or alternatively, user input (e.g., stylus-based input, mouse clicks, etc.) can be received and used for the purpose of determining an image parameter as described herein.

In block 756, the image processor transforms the input RGB image (752) in the RGB color space to a linear XYZ image in a linear XYZ color space. In block 758, the image processor generates a white balanced image in the linear XYZ color space by performing white balance compensation operations on the linear XYZ image, for example, to remove unrealistic color cast that may be introduced in image acquisition. In some embodiments, the white balance compensation operations may comprise illumination source color estimation operations using one or more of a variety of available techniques.

In block 760, the image processor transforms the white balanced image in the linear XYZ color space to a non-linear XYZ image in a non-linear XYZ color space. For the purpose of illustration, the non-linear XYZ image to which the white balanced image is converted is a log XYZ image. In block 764, the image processor performs image-relative normalization on the log XYZ image to normalize the log XYZ image into a normalized image in which the relative luminance value for the diffuse white channel values is one (1).

In block 766, the image processor renormalizes the normalized image into a renormalized image in which an absolute luminance value for the diffuse white (DW) point in the image (702) is set to a specific absolute luminance value. This specific absolute luminance value may be selected based on one or more selection factors. Examples of selection factors for selecting absolute luminance values for DW points in images may include, but are not necessarily limited to, any of: display applications, display devices, display technologies, dynamic ranges of display devices, image content in scenes or groups of pictures, image content represented in images, etc.

In block 762, the image processor detects highlights in the log XYZ image, generates a highlight mask to be used for highlight management/rendering, etc. The highlights may comprise pixels with luminance values or code values no less than a luminance value or code value represented by the channel diffuse white values. The image processor may classify or identify the detected highlights in the linear XYZ image into one or more highlight groups. One or more of a variety of highlight detection and classification techniques can be used by the image processor to identify a highlight group that comprises one or more highlights (or highlight regions) with one or more (e.g., common, perceptual, etc.) image characteristics such as colors, luminance levels, patterns, textures, spatial relationships, etc. A plurality of highlight classifiers such as a highlight type, a highlight surround level and a highlight size, etc., may be generated by the image processor for each highlight group in the image based on the image characteristics of the highlight group, attributes/characteristics of surround portions or the overall image, etc.

In block 768, the image processor uses the highlight mask, highlight classifiers, etc., generated from highlight detection in block 762, computes/selects one or more highlight gains for the highlights in the highlight groups, generates a scaled renormalized image by scaling luminance amplitude of the highlight groups in the renormalized image, etc. One or more highlight classifiers of a highlight group can be used as input to select/calculate a highlight gain for the highlight group for pixels in the highlight group.

In block 770, the image processor converts the scaled renormalized image to an output image into a target color gamut supported by a target display application, a target display device, etc. The target color gamut may be in a target color space which may or may not the same as the color space in which the input RGB image (752) is represented.

6. Example Process Flows

Figure 8:
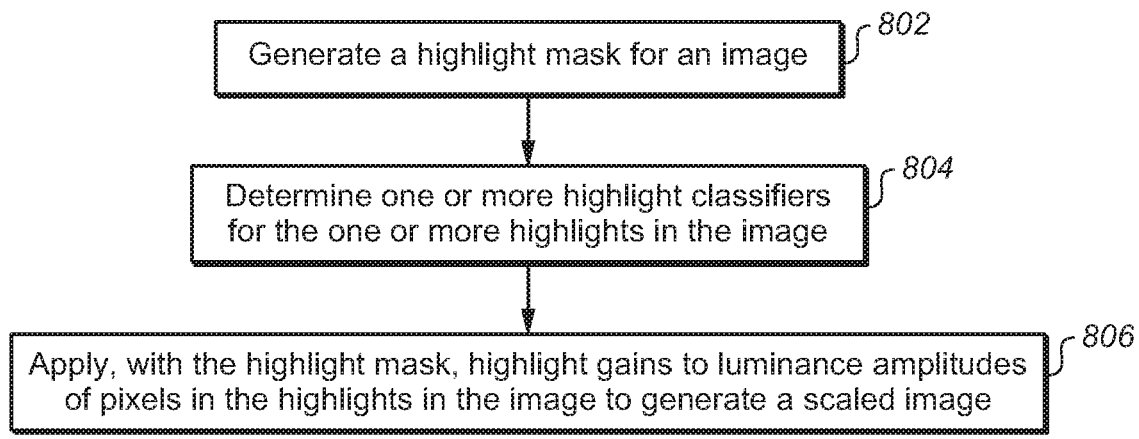
FIG. 8 illustrates an example process flows.

FIG. 8 illustrates an example process flow according to an embodiment of the present invention. In some embodiments, one or more computing devices or components (e.g., an image processor, a display device, an image rendering device, etc.) may perform this process flow. In block 802, an image processing device generates a highlight mask for an image. The highlight mask identifies one or more highlights in the image.

In block 804, the image processing device determines one or more highlight classifiers for the one or more highlights in the image.

In block 806, the image processing device applies, with the highlight mask, one or more highlight gains to luminance amplitudes of pixels in the one or more highlights in the image to generate a scaled image. The one or more highlight gains for the one or more highlights are determined based at least in part on the one or more highlight classifiers determined for the one or more highlights.

In an embodiment, the highlight mask comprises masking values to prevent applying highlight gains to luminance values of pixels not in the one or more highlights in the image. In an embodiment, the highlight mask comprises non-binary masking values. In an embodiment, the highlight mask comprises masking values to prevent applying highlight gains to luminance values of pixels that are neither in a transition region for which a blending function is defined nor in the one or more highlights in the image. In an embodiment, the blending function represents one of a sigmoidal function, a monotonic function, a polynomial, an analytical function, or a first-order differentiable function. In an embodiment, the blending function is defined over a support extending over edges of a highlight.

In an embodiment, the one or more highlight classifiers comprise one or more of a highlight type, a highlight size, or a highlight surround level.

In an embodiment, at least one of the one or more highlight classifiers is derived from one or more of luminance levels of highlight surrounds, highlight sizes, dispersedness or contiguousness of highlights, numbers of highlights, average sizes of highlights, image-wide contrast ratios, region-based contrast ratios, average local contrasts in highlight surrounds around highlights, combinations of one or more types of highlights, presence or absence of emissives, presence or absence of white object specular reflections, presence or absence of non-white object specular reflections, presence or absence of multiple different highlight types, etc.

In an embodiment, the highlight mask is generated based on one or more of histograms of luminance levels, Gaussian pyramids, difference-of-Gaussians pyramids, etc.

In an embodiment, the one or more highlight gains are derived from corresponding highlight gain factors in a highlight management table. In an embodiment, the highlight management table is constructed at least in part based on viewer preference studies. In an embodiment, the corresponding highlight gain factors are retrieved from the highlight management table based on the one or more highlight classifiers as input parameters to the highlight management table.

In an embodiment, the image comprises image data in one or more channels of an RGB color space, an XYZ color space, an YCbCr color space, an YDzDx color space, a perceptually quantized color space, etc.

In an embodiment, the image processing device is further configured to generate an output image based on the scaled image.

In an embodiment, the image processing device is further configured to determine a diffuse white (DW) point for the image.

In an embodiment, the one or more highlights are detected in a linear color space. In an embodiment, the one or more highlights are detected in a non-linear color space.

In an embodiment, the image processing device is further configured to perform: generating a highlight image based on the one or more highlights in the image; using the highlight image to drive a highlight rendering mechanism of a display device to render the one or more highlights; etc.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
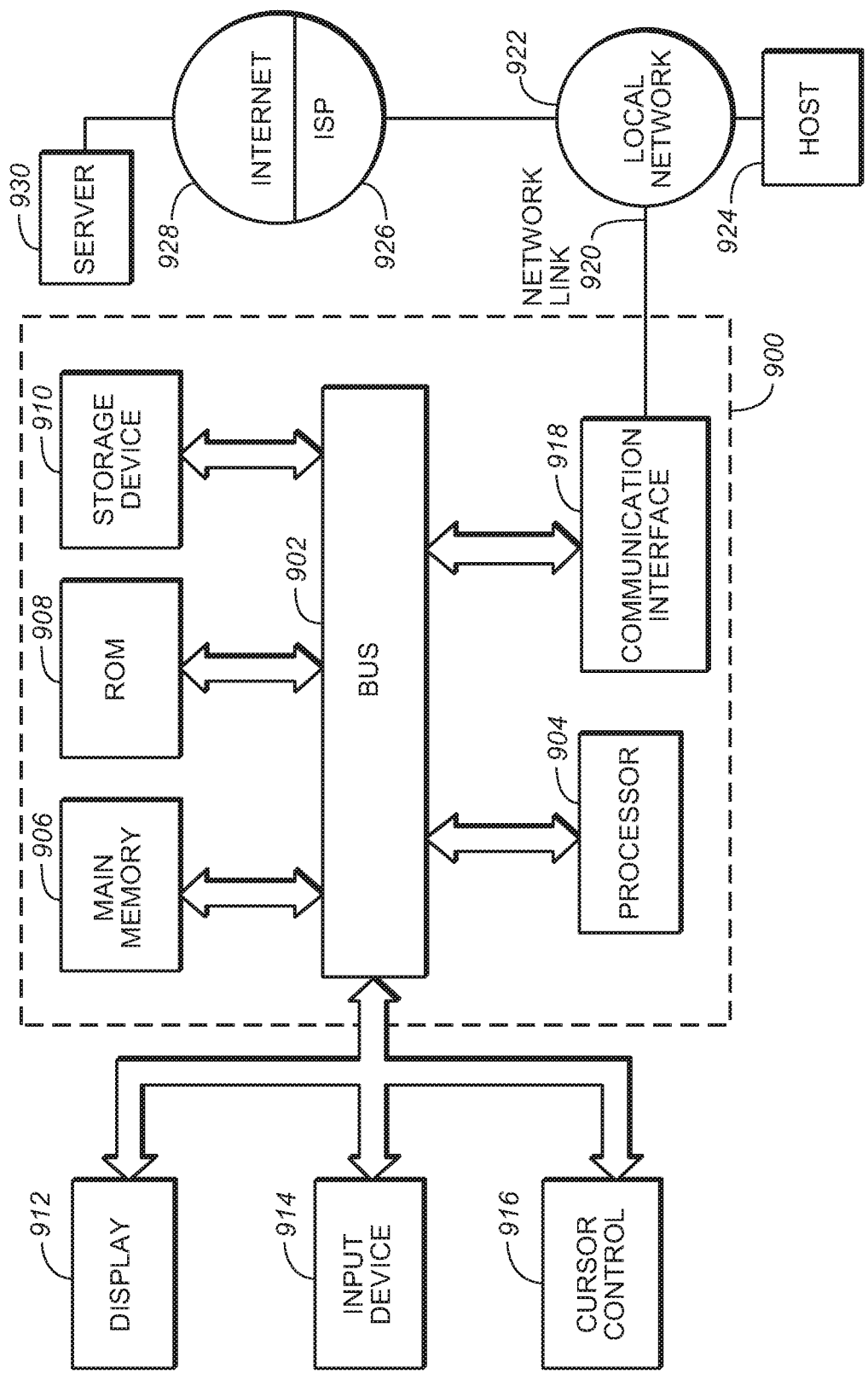
FIG. 9 illustrates an example hardware platform on which a computer or a computing device as described herein may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display, for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques as described herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

8. Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
   determining a diffuse white (DW) point for the image;
   generating a highlight mask for an image, the highlight mask identifying one or more highlights in the image, wherein the one or more highlights comprise pixels representing portions of the image that have luminance values higher than the determined DW point;
   determining one or more highlight classifiers for the one or more highlights in the image,
   wherein the one or more highlight classifiers comprise a highlight type, a highlight size, and a highlight surround level,
   wherein the highlight type comprises one of a mixed lighting, a specular only highlight, a specular highlight, an emissive highlight, and a white object,
   wherein the highlight size is determined by comparing a total number of pixels of a highlight with a highlight size threshold, and
   wherein the highlight surround level is determined based on luminance values of non-highlight pixels in regions surrounding a highlight;
   applying, with the highlight mask, one or more highlight gains to luminance amplitudes of pixels in the one or more highlights in the image to generate a luminance-amplitude scaled image, the one or more highlight gains for the one or more highlights being determined based at least in part on the one or more highlight classifiers determined for the one or more highlights;
   wherein the method is performed by one or more computing devices.

2. The method as recited in claim 1, wherein the highlight mask comprises masking values to prevent applying highlight gains to luminance values of pixels not in the one or more highlights in the image.

3. The method as recited in claim 1, wherein the highlight mask comprises non-binary masking values.

4. The method as recited in claim 1, wherein the highlight mask comprises masking values to prevent applying highlight gains to luminance values of pixels that are neither in a transition region for which a blending function is defined nor in the one or more highlights in the image.

5. The method as recited in claim 4, wherein the blending function is one of a sigmoidal function, a monotonic function, a polynomial, an analytical function, or a first-order differentiable function.

6. The method as recited in claim 4, wherein the blending function is defined over a support extending over edges of a highlight.

7. The method as recited in claim 1, wherein determining one or more highlight classifiers for the one or more highlights in the image further comprises determining one or more highlight descriptors for the one or more highlights in the image, each highlight descriptor based on a set of highlight attributes and locations of highlight pixels, and wherein applying one or more highlight gains to luminance amplitudes of pixels in the one or more highlights comprises assigning the highlights to one or more highlight groups associated with the highlight descriptor and determining one or more highlight gains for the one or more highlight groups based at least in part on the one or more highlight descriptors determined for the one or more highlight groups.

8. The method as recited in claim 1, wherein at least one of the one or more highlight classifiers is derived from one or more of luminance levels of highlight surrounds, highlight sizes, dispersedness or contiguousness of highlights, numbers of highlights, average sizes of highlights, image-wide contrast ratios, region-based contrast ratios, average local contrasts in highlight surrounds around highlights, combinations of one or more types of highlights, presence or absence of emissives, presence or absence of white object specular reflections, presence or absence of non-white object specular reflections, or presence or absence of multiple different highlight types.

9. The method as recited in claim 1, wherein the highlight mask is generated based on one or more of histograms of luminance levels, Gaussian pyramids, or difference-of-Gaussians pyramids.

10. The method as recited in claim 1, wherein the one or more highlight gains are derived from corresponding highlight gain factors in a highlight management table.

11. The method as recited in claim 10, wherein the highlight management table is constructed at least in part based on viewer preference studies.

12. The method as recited in claim 10, wherein the corresponding highlight gain factors are retrieved from the highlight management table based on the one or more highlight classifiers as input parameters to the highlight management table.

13. The method as recited in claim 1, wherein the image comprises image data in one or more channels of an RGB color space, an XYZ color space, an YCbCr color space, an YDzDx color space, or a perceptually quantized color space.

14. The method as recited in claim 1, further comprising generating an output image based on the luminance-amplitude scaled image.

15. The method as recited in claim 1, wherein the DW point for the image represents one of a global maximum DW point for all portions of the image, a local maximum DW point for a subset of all portions of the image, a mean DW point for one or more portions of the image, or a weighted DW point for one or more portions of the image.

16. The method as recited in claim 1, wherein the one or more highlights are detected in a linear color space.

17. The method as recited in claim 1, wherein the one or more highlights are detected in a non-linear color space.

18. The method as recited in claim 1, further comprising:
generating a highlight image based on the one or more highlights in the image;
using the highlight image to drive a highlight rendering mechanism of a display device to render the one or more highlights.

19. An apparatus comprising a processor and configured to perform the method as recited in claim 1.

20. A non-transitory computer readable storage medium, storing software instructions, which when executed by one or more processors cause performance of the method as recited in claim 1.

21. A computing device comprising one or more processors and one or more storage media storing a set of instructions which, when executed by the one or more processors, cause performance of the method as recited in claim 1.

* * * * *